United States Patent [19]

Beran

[11] Patent Number: 5,414,865
[45] Date of Patent: May 9, 1995

[54] SELF-PROGRAMMING WITH LIMITED SEQUENTIAL MEMORY CAPACITY

[76] Inventor: James T. Beran, 2106 Oberlin St., Palo Alto, Calif. 94306

[21] Appl. No.: 722,093

[22] Filed: Jun. 27, 1991

Related U.S. Application Data

[63] Continuation-in-part of Ser. No. 776,819, Sep. 17, 1985, abandoned.

[51] Int. Cl.$^6$ .............................................. G06F 15/00
[52] U.S. Cl. ........................ 395/800; 364/221.3; 364/246.9; 364/259.2; 364/274.1; 364/DIG. 2; 364/916.2; 364/972.2; 395/500; 395/50
[58] Field of Search ........................ 395/800, 50, 500

[56] References Cited

U.S. PATENT DOCUMENTS

| | | | |
|---|---|---|---|
| 3,924,109 | 12/1975 | Jhu et al. | 371/25.1 |
| 4,366,551 | 12/1982 | Holtz . | |
| 4,516,202 | 5/1985 | Kadowaki . | |
| 4,591,980 | 5/1986 | Huberman et al. . | |
| 4,773,024 | 9/1988 | Faggin et al. . | |
| 4,782,459 | 11/1988 | Johnston | 364/724.19 |
| 4,802,103 | 1/1989 | Faggin et al. . | |
| 4,884,216 | 11/1989 | Kuperstein . | |
| 4,933,871 | 6/1990 | DeSieno . | |
| 4,979,124 | 12/1990 | Sachse et al. | 364/507 |
| 4,996,648 | 2/1991 | Jourjine . | |
| 5,003,490 | 3/1991 | Castelaz et al. . | |
| 5,113,482 | 5/1992 | Lynne | 395/23 |
| 5,155,801 | 10/1992 | Lincoln | 395/22 |
| 5,159,660 | 10/1992 | Lu et al. | 395/22 |
| 5,161,232 | 11/1992 | Beran | 395/800 |
| 5,165,010 | 11/1992 | Masuda et al. | 395/27 |

FOREIGN PATENT DOCUMENTS

WO87/01837 3/1987 WIPO .

OTHER PUBLICATIONS

Heiserman, D. L., Robot Intelligence, Blue Ridge Summit: TAB Books, 1981, pp. 13–23, 31–50, 61–66, 91–105, 140–159, and 219–290.
Heiserman, D. L., How to Build Your Own Self-Programming Robot, Blue Ridge Summit: TAB Books, 1979, pp. 9–19 and 175–218.
Interrant, L. D., and Biegel, J. E., "The Marriage of Artificial Intelligence and Robotics in the Manufacturing Environment," Robots 9 Proceedings, Jun., 1985, pp. 16–1 through 16–16.
Narendra, K. S. and Thathachar, M. A. L., "Learning Automata—a Survey," IEEE Transactions on Systems, Man, and Cybernetics, vol. SMC–4, No. 4, Jul. 1974, pp. 323–334.
Nelson, M. E., Furmanski, W., and Bower, J. M., "Simulating Neurons and Networks on Parallel Computers," in Koch, C. and Segev, I., Eds., Methods in Neuronal Modeling, MIT Press, 1989, pp. 397–400 and 435–437.
Schneider, W., and Detweiler, M., "A Connectionist/Control Architecture for Working Memory," in Bower, G. H., Eds., The Psychology of Learning and Motivation, vol. 21, Academic Press, 1987, pp. 53–73.

Primary Examiner—Parshotam S. Lall
Assistant Examiner—Agni Mohamed

[57] ABSTRACT

Each self-programming module in a network uses its input signals to obtain a sequence of received signals. Each received signal is used to obtain a control data item having a first or a second value. If the first value, the received signal is also used to obtain a generated data item. If the second value, a learning response can occur, storing a limited length sequence of previous generated data items so that each can be accessed with data items having the same value as the received signal for which it was obtained. A generated data item can be obtained by accessing a stored previous generated data item. If none has been stored for the current received signal or in case of repetition of received signals or a long gap between learning responses, a random number can be obtained as the generated data item. When the control data item has the second value, the module can provide an output signal, and the output signal from one module can be an input signal to another. Each module can also use its generated data items in obtaining its received values. The network can include various feedback loops, and can be simulated by a serial machine.

39 Claims, 18 Drawing Sheets

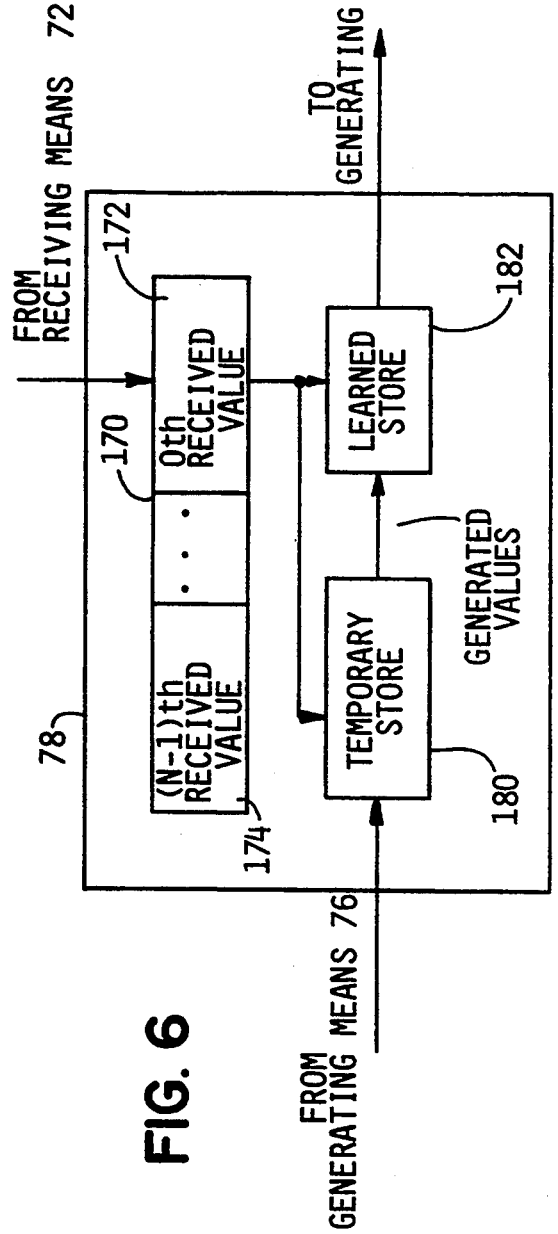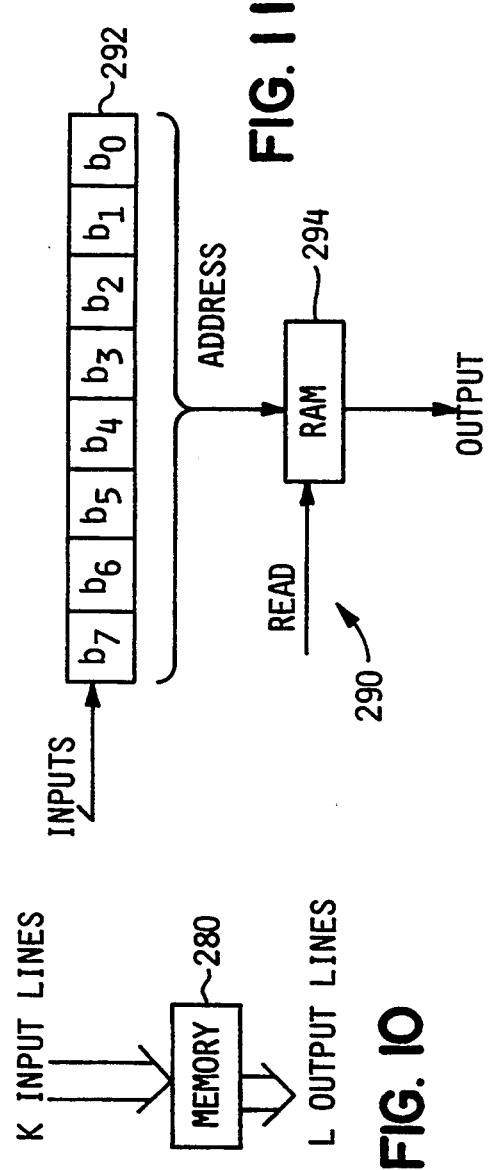

SELF-PROGRAMMING WITH LIMITED SEQUENTIAL MEMORY CAPACITY

This application is a continuation-in-part of U.S. patent application Ser. No. 06/776,819, filed Sep. 17, 1985, now abandoned, continued as Ser. No. 07/850,214, now issued as U.S. Pat. No. 5,161,232.

The invention relates to self-programming techniques.

Beran, WO-87/01837, corresponding to U.S. patent application Ser. No. 06/776,819, incorporated herein by reference, describes a modular self-programming circuit. As shown and described in relation to FIGS. 2 and 5, an input signal is compared with an expectation signal that may indicate a goal. When the input matches the expectation signal, a sequence or part of a sequence of generated signals that preceded the matching input is stored. As shown and described in relation to FIG. 6, data entries may include a generated output, a preceding input, and an expected input. FIG. 7 shows how modules can be interconnected.

SUMMARY OF THE INVENTION

The present invention provides self-programming techniques that use each received signal to obtain a control data item. If the control data item has a first value, a generated data item is obtained. If the control data item has a second value, a preceding received signal's generated data item is stored so that it can subsequently be accessed using another received signal having the same value as the preceding received signal.

One aspect of the invention is based on the recognition of a basic tension in self-programming. A self-programming component that receives signals and that responds by producing data should produce similar data in response to similar sequences of signals. Yet a self-programming component must, to some extent, modify its responses to sequences of signals in order to perform self-programming. In short, there is a conflict between stability and learning—too much stability precludes learning while too much learning produces instability.

This aspect of the invention is based on the discovery that this conflict can be alleviated by storing data that determines each response in a way that permits both stability and learning. As signals are received, data items are generated in response until a signal is received that produces a learning response. The learning response stores a preceding received signal's generated data item so that it can be accessed using another received signal having the same value as the preceding received signal. As a result, if a signal having that value is received, the same data item can be generated in response. Therefore, the responses to at least some signals stabilize as a result of learning while the responses to other signals can change, permitting further learning.

This solution can be implemented by storing both a generated data item and the respective received signal in memory, positioned so that the generated data item can be accessed upon accessing the received signal. The received signal can then be accessed and compared with a currently received signal. If they match, the generated data item can be accessed.

This solution can also be implemented by storing the generated data item at a location in memory that is indicated by the respective received signal. For example, the generated data item can be stored at a location in random access memory (RAM) so that the RAM can be addressed with a received signal having the same value to access the stored generated data item. Or the generated data item can be stored in a lookup table or similar data structure so that it can be accessed using a received signal as an offset or other address into the data structure.

A closely related aspect of the invention is based on the recognition of another basic problem in self-programming. As described above, a self-programming component can learn by storing a preceding generated data item. More generally, it can store a sequence of preceding generated data items. For example, the sequence that leads to a received signal that meets a criterion could be stored. The problem arises in relation to the length of the sequence that is stored.

Ideally, whenever the criterion for a learning response is met, the self-programming circuit would store the complete sequence of generated data items since the last time the criterion was met. If the sequences were all short it might be possible to store every successful sequence of generated items. In most cases of practical interest the successful sequences of generated items can be arbitrarily long, so that storing all the successful sequences is impossible—eventually all available memory would be consumed.

This aspect is further based on the discovery that this problem can be solved by limiting the length of the sequence that is stored. This solution can be implemented by temporarily storing data indicating the values of a limited length sequence of received signals, and by storing the respective generated item for each received signal in the limited length sequence. For example, a data item for each received signal could be stored in a stack or similar memory of limited length such that pushing a new data item onto a full stack also pushes the oldest data item off the stack. The respective generated item for each item on the stack could also be stored on the stack, or could be stored so that it can be accessed using a data item from the stack. When the criterion is met, the limited length sequence could be read from the stack and stored so that each generated item can be accessed in response to the respective received signal. The stack could be stored in a shift register.

One problem with this implementation is that the same received signal may occur twice in the limited length sequence but with different generated items. A problem arises in deciding which generated item should be stored.

One way to avoid this problem is to overwrite any previously stored generated item. If the previously stored generated item came from the same successful sequence, however, it should not be overwritten unless it occurred earlier in the sequence, since the later generated item was closer in the sequence to the ultimately successful generated item. This solution could be implemented by temporarily storing the most recent received signals with their generated items and writing them into memory from oldest to most recent during a learning response. Another implementation saves only one generated item for each received signal value, so that previous generated items for the same received signal value are immediately overwritten.

Plural generated items with the same respective received signal value also arise when different successful sequences include different generated items for the same received signal value. In this situation, the problem can be solved by storing a number of generated items for each received signal value. Data about the frequency or recency of each generated item can also be stored and used to select one to be overwritten when the maximum number has been reached for one of the received signal values. An identifier can also be stored with each generated item indicating the successful sequence or sequences in which it occurred. A frequency or recency criterion can then be applied to the preceding generated values to select one of the sequence identifiers.

In general, most of the implementations described above include two forms of storage. One storage means is for temporarily storing data indicating recently received signal values and their generated items. Another storage means is for storing data indicating generated items for access using a received signal value. The duplication of storage conflicts, however, with module simplicity.

A related aspect of the invention is based on the discovery of a technique that reduces duplication of storage. This technique includes three forms of storage. A first storage means is for storing recently received values, and can be a set of registers or other components managed as a stack or a shift register. A second storage means is for storing recently generated items and can be RAM or registers accessible with received signal values from the first storage means. The third storage means is for storing data indicating generated items from successful sequences, and can also be RAM or registers accessible with received signal values from the first storage means.

During a learning response, generated items from the successful sequence up to the limited length can be read from the second storage means and written into the third storage means. During a sequence of steps when none of the received signals produces a learning response, generated items from the third storage means can be retrieved and temporarily stored in the second storage means.

A closely related aspect of the invention is based on the recognition of fundamental problems in this simple implementation, problems that may also affect more complex implementations. These problems fall into four main categories—problems with no stored generated item, problems with repeating sequences of received signals, problems with lengthy sequences of generated items that do not lead to a learning response, and problems with restarting after a learning response.

One aspect of the invention is based on the recognition that several of these problems can be solved by means for generating random numbers. The problems can be detected as appropriate such as by detecting that no generated item is in the third storage means for a currently received signal; that several identical signals have been received; that a sequence of signals of a maximum length has been received without a learning response; or, in some cases, that a learning response has occurred. In addition to generating and temporarily storing a random value as one of the generated items, other appropriate steps may be required. For example, after a learning response, the first storage means can be cleared so that it will not contain spurious data if another learning response occurs quickly.

Another aspect of the invention is based on the recognition of a fundamental problem in interconnecting self-programming modules. In general, the generated items described above can have approximately as many bits as the received signals. If these generated items are provided as outputs to other modules, the interconnections between modules become very complex for values with more than a few bits.

This aspect is further based on the discovery of a simple technique for reducing the interconnections between modules. This technique provides an output signal that indicates when the received signal meets a criterion. This simple solution can reduce the number of output signals from each module to one binary time varying signal. The learning response can also occur whenever the received signal meets the criterion, so that the output signals indicate occurrences of the learning response.

A closely related aspect of the invention solves the problem of how to use the inputs to a given module to produce a received signal. For example, if a module has sixteen input connections, a four bit binary number could indicate at any given time which of the sixteen was the most recent to provide an output signal from another module. Another simple technique is to treat each input signal as a respective bit of a received signal that is a binary number.

These techniques present difficulties because the inputs to a given module may remain unchanged for an indefinite time period, during which its criterion would be continuously met or unmet. This problem can be solved by periodically sampling the input to a module. This solution could be implemented by synchronizing the modules so that all would provide their outputs during one part of a cycle, then all would read their inputs during a later part of the cycle. But synchronizing circuitry would seriously complicate a network of modules.

Another solution, which does not require synchronizing circuitry, is to use both input signals and generated data items to obtain received signals. For example, a received value counter could be incremented and decremented to obtain received counters. Some input signals could lead to incrementing, while others lead to decrementing, and the amounts of increment and decrement could depend on the current generated item. An output pulse and learning response could occur only when the counter reaches a threshold value. This solution is advantageous because each module can learn how to respond to its inputs in a way that provides a simple, time-varying output signal. Each module may be thought of as learning to detect patterns of its inputs. After a learning response, the counter could be cleared to restart.

This solution can be implemented in a network with a number of modules. An input transducer for the network provides input signals to one or more modules in the network, and one or more modules provide output signals to an output transducer for the network. The modules could be interconnected to provide multiple feedback paths, permitting multiple stable frequencies for some modules.

A closely related aspect of the invention is based on the observation that the physical implementation of such a network for a specific combination of transducers may require extensive adjustment of parameters. This problem can be solved by first implementing a software simulation of the network. When the simulation is successfully implemented, an equivalent circuit could then be designed.

These and other aspects, features, objects, and advantages of the invention are described below in relation to the figures.

BRIEF DESCRIPTION OF THE DRAWINGS

FIG. 6 is a schematic block diagram showing general components of the storing means of FIG. 3.

FIG. 10 is a schematic diagram illustrating memory capacity.

FIG. 11 is a schematic diagram of a memory with limited length sequential input capacity.

DETAILED DESCRIPTION

A. Conceptual Framework

Figure 1:
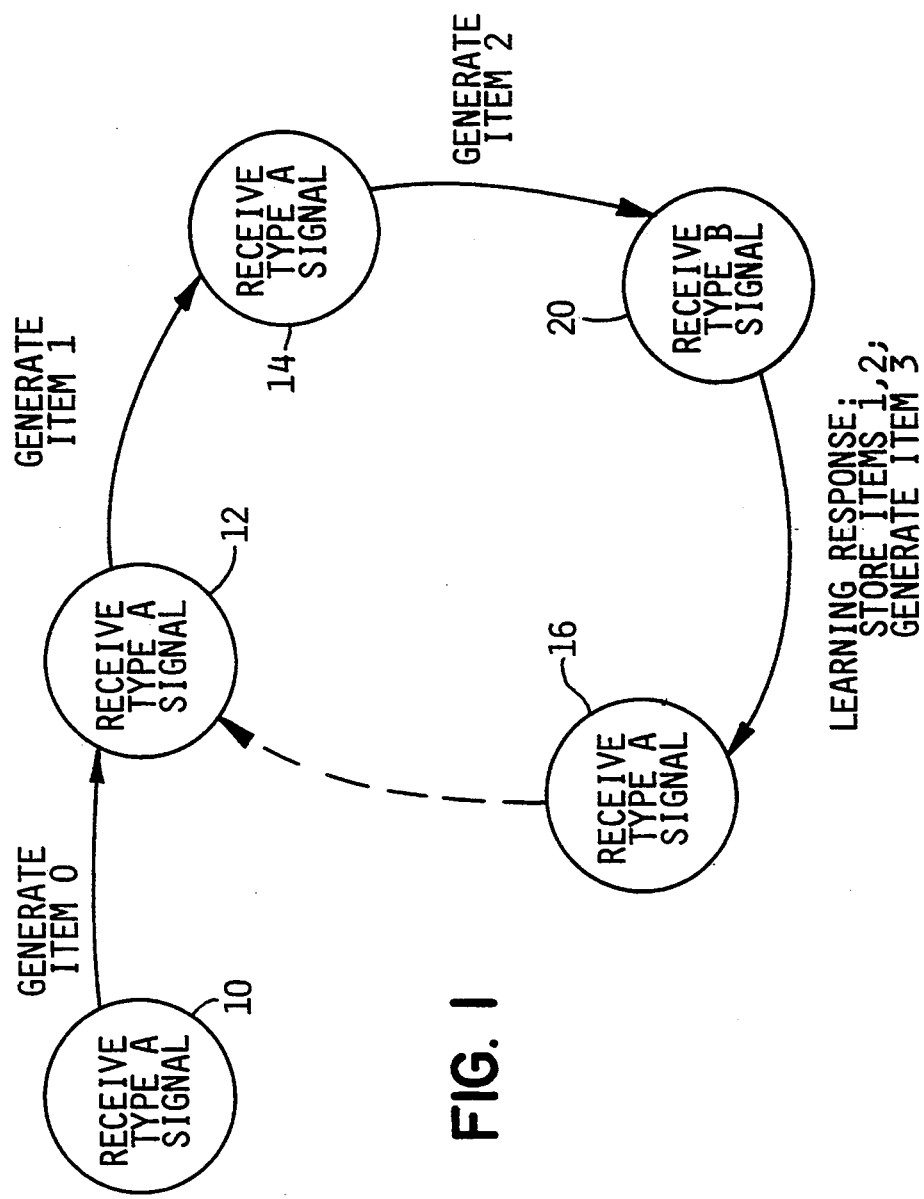
FIG. 1 is a state-transition diagram showing the occurrence of a learning response of a self-programming component.

The following conceptual framework is helpful in understanding the broad scope of the invention, and the terms defined below have the indicated meanings throughout this application, including the claims.

The word "data" refers herein to signals that indicate information. When an item of data can indicate one of a number of possible alternatives, the item of data has one of a number of "values." For example, a binary item of data has one of two values, such as "0" or "1" or "ON" and "OFF."

Data include data existing in any physical form, and include data that are transitory or are being stored or transmitted. A "data storage medium" or "storage medium" is a physical medium that stores data. A "data transmission medium" or "transmission medium" is a physical medium that transmits data from one location to another.

"Circuitry" or a "circuit" is any arrangement of matter that can respond to first data at one location or time by providing second data at another location or time. Circuitry "stores" the first data when it receives the first data at one time and, in response, provides substantially the same data at another time. Circuitry "transfers" the first data when it receives the first data at a first location and, in response, provides substantially the same data at a second location.

Any two components of circuitry are "connected" when there is a combination of circuitry that can transfer data from one of the components to the other.

A "data processing system" is a combination of circuitry that processes data. A "data processor" or "processor" is any component or combination of circuitry that can process data, and may include one or more central processing units or other processing components. A processor performs an operation or a function "automatically" when it performs the operation or function independent of concurrent human control. A "processing unit" is a processor that is a component within another processor.

"Memory" is any component, combination of components, or system that can store data, and may include local and remote memory and input/output devices. Stored data can be "accessed" by any operation that retrieves or modifies the data. An "address" is one of a set of values to each of which a memory responds by permitting access to a respective stored data item. A stored data item that can be accessed using an address or by another operation that distinguishes it from other stored data items has a "position" in memory defined by the operation that distinguishes it from other stored data items. A first data item can be accessed "based on the position" of a second stored data item if the first data item's position can be obtained using the second data item's position.

A processor "accesses" data in memory by any operation that retrieves or modifies the data, such as by reading or writing the data. A processor can be "connected for accessing" data by any combination of connections with local or remote memory or input/output devices that permits the processor to access the data.

A processor "uses" data in performing an operation or "operates on data" when the result of the operation depends on the value of the data. A stored data item can be "accessed using" or "accessible using" another data item if the memory position of the stored data item can be obtained using the other data item. For example, the other data item may be an address, an offset used to produce an address, or a content-addressable value stored with the stored data item.

To "obtain" or "produce" data is to perform any combination of operations that begins without the data and that results in the data. Data can be "obtained from" or "produced from" other data by operations that obtain or produce the data using the other data.

A "memory element" is any combination of circuitry that can store data. A "memory cell" is a memory element that can store a single unit of data, such as a bit or other n-ary digit or an analog value. A "register" is a memory element that includes an array of memory cells for temporary storage of data. A "shift register" is a register in which the data stored in all of the memory cells can be shifted along a dimension of the array to the next memory cell. If the array is one-dimensional, the shifting operation can receive and store a series of bits of data or it can provide a series of bits of data as output.

An operation "writes" or "sets" a memory element or memory cell by storing data in the memory element or memory cell. An operation reads a memory element or memory cell by producing data indicating the value of data stored in the memory element or memory cell. A memory element or memory cell is "selected" by being put into a state in which it can be read or written. The data stored in a memory element or memory cell is "accessed" by being read or written.

An operation "transfers" data from a first memory element or memory cell to a second if the result of the operation is that the data stored in the second memory element or memory cell are the same as the data that were stored in the first memory element or memory cell prior to the operation. An operation "copies" data from a first memory element or memory cell to a second if the operation transfers the data from the first memory element or memory cell to the second and if, after the operation, the data stored in the first memory element or memory cell are the same as the data that were stored there prior to the operation. An operation "modifies" data that indicate one of a number of value,s when it changes the data to indicate a different one of the values.

An operation obtains a "random number" when it obtains a number from a range of numbers in such a way that the likelihood of obtaining any number in the range is approximately the same. "Random" therefore includes both random and pseudorandom.

B. General Features

Figure 2:
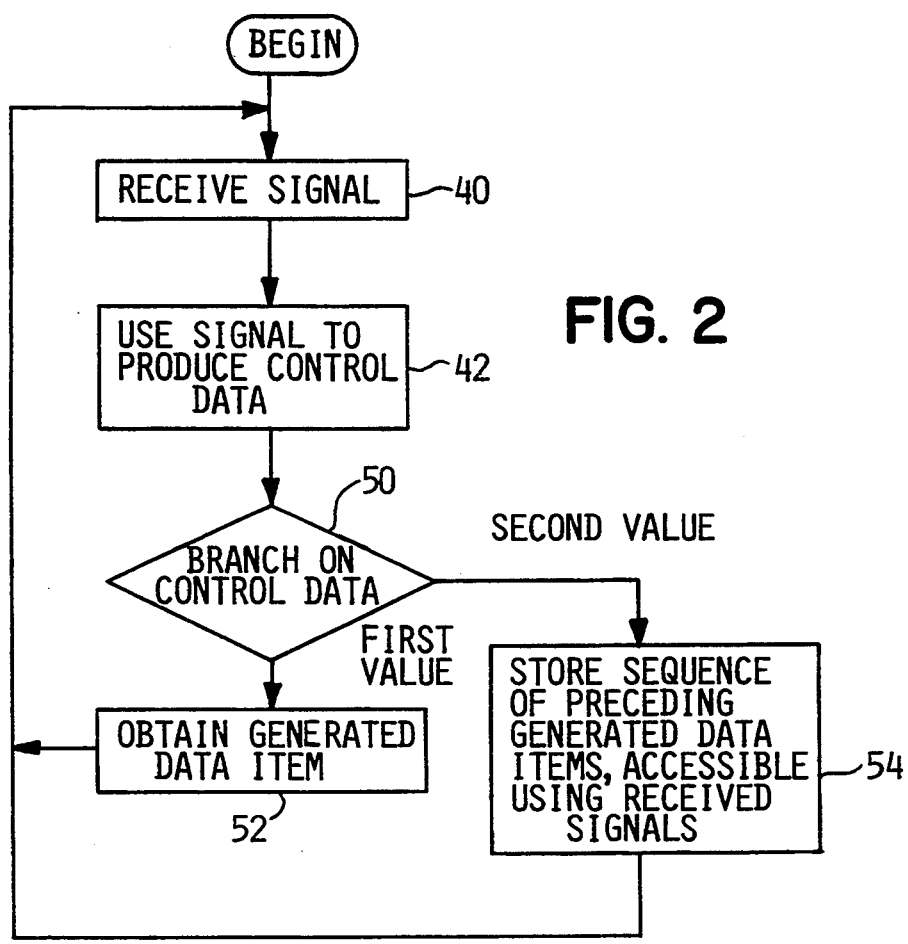
FIG. 2 is a flow chart showing general steps in self-programming that includes a learning response as in FIG. 1.
Figure 3:
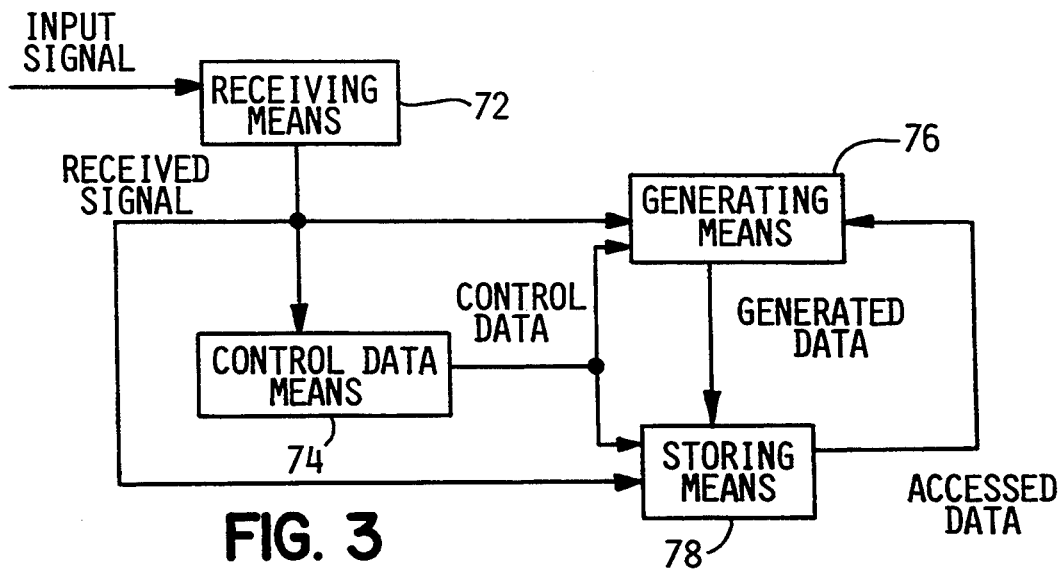
FIG. 3 is a schematic block diagram showing general functional components of a self-programming component that can perform a learning response as in FIG. 1.
Figure 4A:
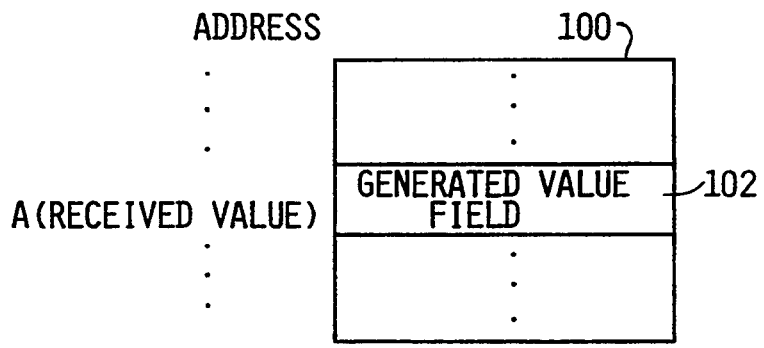
FIGS. 4A, 4B, and 4C show ways in which data can be stored during a learning response in FIG. 2.
Figure 4B:
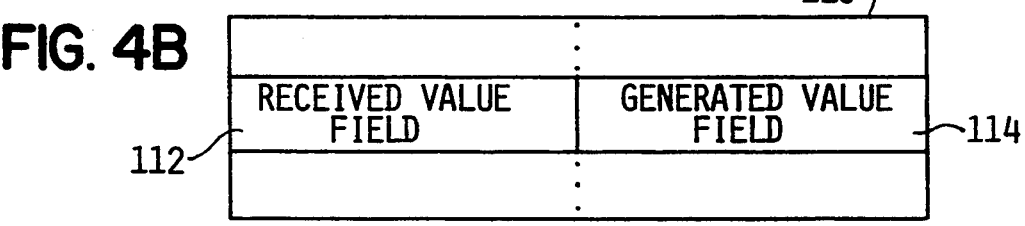
Figure 4C:
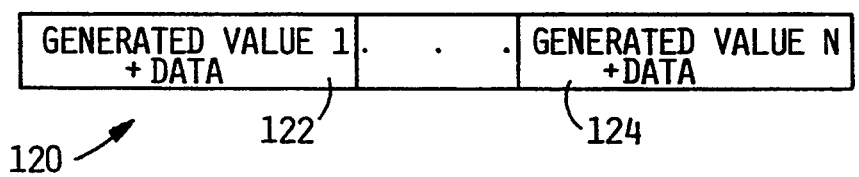
Figure 5:
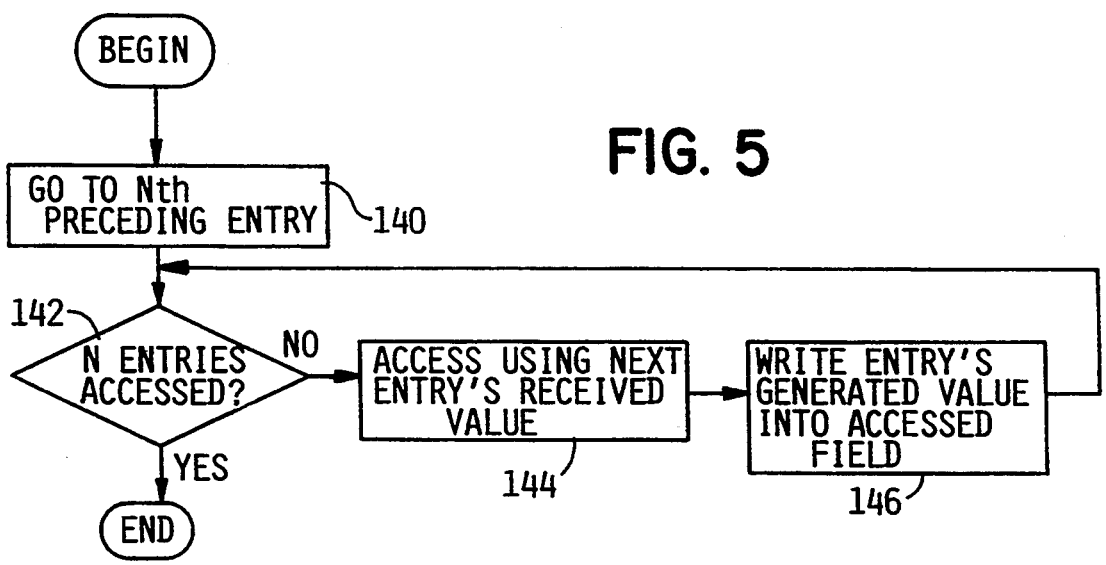
FIG. 5 is a flowchart showing steps in a learning response that stores a limited length sequence.
Figure 7:
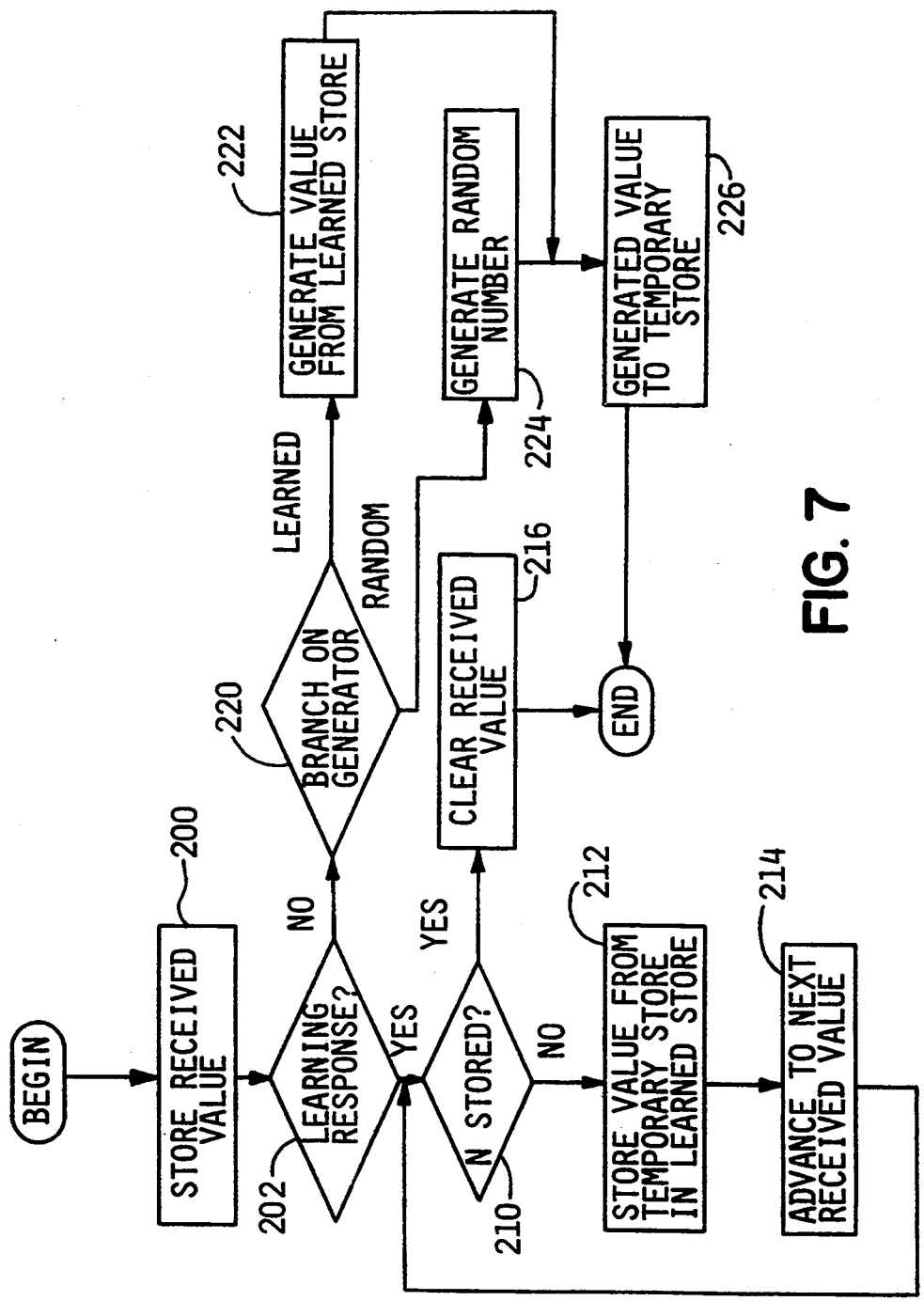
FIG. 7 is a flowchart showing steps in a learning response using the components in FIG. 6.
Figure 8:
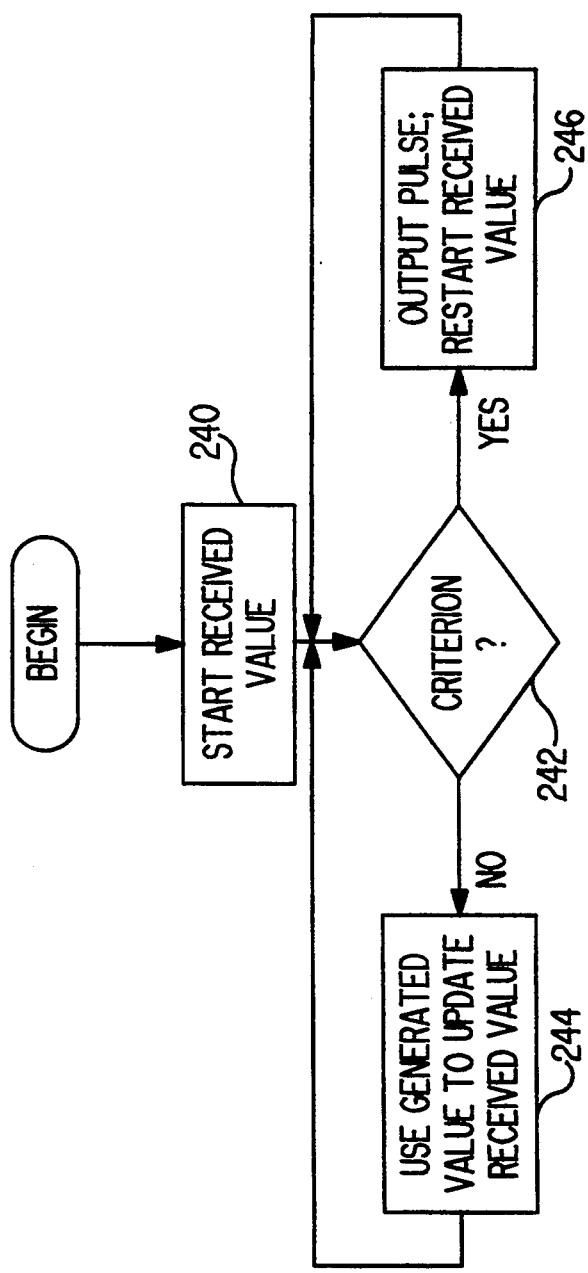
FIG. 8 is a flowchart showing steps in producing an output signal and a received signal.
Figure 9:
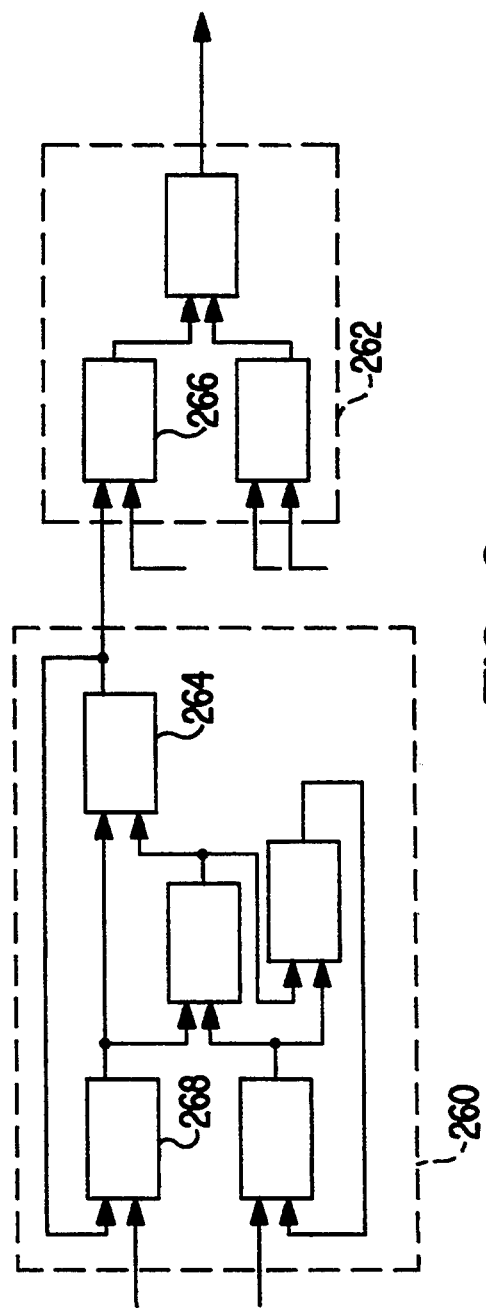
FIG. 9 is a schematic diagram showing self-programming modules in a network.

Some general features of the invention can be understood from FIGS. 1–9. FIG. 1 shows how a learning response can occur in self-programming. FIG. 2 shows general steps in the operation of a self-programmer that performs a learning response. FIG. 3 illustrates general components of a self-programming module that can perform a learning response. FIGS. 4A, 4B, and 4C are examples of entries stored during a learning response. FIG. 5 shows steps in a learning reponse that stores a limited length sequence from oldest to most recent. FIG. 6 shows general components that store data used during a learning response, in which data are overwritten. FIG. 7 shows steps in a learning response including generation of random numbers. FIG. 8 shows steps in producing an output signal when a learning response occurs and in producing a received signal using a generated signal. FIG. 9 shows how self-programming modules can be connected into a network with feedback and with more local than non-local interconnections.

FIG. 1 is a state-transition diagram in which each state represents a state of a system from which a self-programmer receives signals and to which the self-programmer provides signals. The signals provided by the self-programmer can change the state of the system. Therefore, each state shown includes a description of the signal received during that state, and the transitions between states have a description of accompanying steps by the self-programmer.

In states 10, 12, 14, and 16, the self-programmer receives a signal of type A, while in state 20 it receives a signal of type B. In response to signals of type B, the self-programmer performs a learning response as part of the transition to the next state, as shown for the transition from state 20 to state 16.

The transitions from state 10 to state 12, from state 12 to state 14, and from state 14 to state 20 generate respective data items, referred to as data items 0, 1, and 2, respectively. The learning response after state 20 stores a limited length sequence of previously generated data items, in this case only items 1 and 2. In addition, the transition from state 20 to state 16 generates data item 3.

Subsequently, when the self-programmer again receives the signal it received in state 12, it can use the value of the received signal to access data item 1, so that the system may make the transition to state 14. Then the self-programmer can use the value of the signal received in state 14 to access data item 2, so that the system may again make the transition to state 20. A learning response occurs again due to the type B signal received in state 20, but this does not conflict with previous learning.

FIG. 1 therefore illustrates how the conflict described above between stability and learning can be alleviated. Learning can occur in a way that does not conflict with previous learning if the system follows the same state-transition path leading up to the learning response.

FIG. 2 shows general steps that can be performed iteratively in following the state-transition diagram of FIG. 1. The step in box 40 receives a signal. The step in box 42 uses the signal received in box 40 to produce control data that can have a first value or a second value.

The step in box 50 branches on the value of the control data produced in box 42. If the first value, the step in box 52 obtains a generated data item. If the second value, the step in box 54 stores a sequence of generated data items from preceding iterations. Each generated data item is stored so that it is accessible using the value of the received signal in response to which it was obtained.

After the step in box 52 or the step in box 54, another signal can be received in box 40.

FIG. 3 shows general components of a self-programmer 70 that can perform the steps in FIG. 2. Receiving means 72 receives input signals and obtains received signals that are data items having one of a plurality of received signal values. Control data means 74 uses each received signal to obtain a control data item that is provided to generating means 76 and storing means 78.

The control data items can take first and second values. In response to the first value, generating means 76 obtains a generated data item, possibly using a received signal from receiving means 72. In response to the second value, storing means 78 stores a sequence of preceding generated data items from generating means 76. Subsequently, a received signal from receiving means 72 can be used to access a generated data item in storing means 78 that was generated in response to a previous received signal having the same value. Then, generating means 76, operating in response to the first control data value, can use the accessed generated data item in obtaining another generated data item.

FIGS. 4A and 4B show two ways in which generated data items can be stored by storing means 78 for access.

In FIG. 4A, memory 100 includes a number of locations, each of which can be accessed using a respective address. Location 102 includes a generated value field for storing a generated data item. By an appropriate function A(x), a received value can be used to produce an address, with one of the received values resulting in the address of location 102. This is the received value whose generated data item is stored in location 102.

In FIG. 4B, data structure 110 could be a list, a table, or another suitable structure that includes a plurality of entries, each with a received value field 112 and a generated value field 114, as shown for one entry. Each received value's entry can be accessed by comparing the received value with the received value field at each entry until a match is found. The generated value field of the matching entry can then be accessed.

FIG. 4C shows how the generated value field in location 102 in FIG. 4A or generated value field 114 in FIG. 4B could include more than one generated value. Generated value field 120 includes fields 122 through 124. Each field includes a generated value and additional data. The additional data can identify a sequence in which the generated value occurred or can indicate its frequency or recency.

As described above, one way to ensure that a later generated item is not overwritten by an earlier generated item is to write the generated items into memory from oldest to most recent. FIG. 5 shows steps that apply this solution. These steps could be used if each received value and its generated value are temporarily stored in a stack, each stack entry being like the entry shown in FIG. 4B.

When a learning response begins, the step in box 140 goes to the stack entry that is the Nth most recent. N is the limited length of the sequence to be stored during the learning response. The step in box 142 begins an iterative loop that goes through the N stack entries from the Nth most recent to the most recent.

In the step in box 144 in each iteration, the next stack entry's received value is used to access a respective generated value field. The access technique could, for example, be one of those described above in relation to FIGS. 4A and 4B. Then, the step in box 146 writes the stack entry's generated value into the accessed generated value field.

If the accessed generated value field can include only one generated value, then an older generated value is automatically overwritten by a more recent generated value in the same sequence. But if the accessed generated value field includes multiple generated values, further steps can be taken to ensure overwriting. For example, a sequence identifier can be included with each generated value, and if the current sequence identifier is found with one of the stored generated values, that one is overwritten. Otherwise, the generated value to be overwritten can be selected based on recency or frequency.

Recency can be determined from the sequence identifier, with the oldest sequence identifier being a likely candidate for overwriting.

Frequency can be determined by comparing each generated value with the previously stored generated values, and by incrementing count for a matching stored generated value. When a generated value does not match any stored generated values, the one with the lowest count can be selected for overwriting.

FIG. 6 illustrates another way to solve the overwriting problem, with three memory components within storing means 78. Memory component 170 stores a sequence of received values from receiving means 72. The sequence includes N received values, from zeroth received value 172, the most recent, to (N−1)th received value 174, the oldest. Memory component 170 could be implemented, for example, as a shift register or a stack.

The top value in memory component 170 can be used to access two other memory components, temporary store 180 and learned store 182. Temporary store 180 can store generated values from generating means 76. Then, during a learning response, generated values from temporary store 180 can be transferred to learned store 182 by using values from memory component 170 in reverse order. Later, values can be read from learned store 182 and provided to generating means 76 for use in generating a value.

The components of FIG. 6 solve the overwriting problem because temporary store 180 only stores the most recent generated value for each received value. Any previous value is overwritten whenever a new generated value is obtained for a given received value.

FIG. 7 shows steps in operating the components of FIG. 6. The steps in FIG. 7 generally follow those of FIG. 2.

The step in box 200 begins by storing a received value in memory component 170. This step includes whatever operations are necessary to manage memory component 170 so that the received value is the top value and previous received values are held in sequence.

The step in box 202 branches based on whether a learning response is to be performed. This step resembles the branch in box 50 in FIG. 2, and depends on data from control data means 74.

The step in box 210 begins an iterative loop that performs the learning response. Each iteration includes storing a value from temporary store 180 in learned store 182, in box 212, and then advancing to the next received value in memory component 170, in box 214. The step in box 212 uses the top received value in memory component 170 to address both temporary store 180 and learned store 182. When a limited length sequence of N values has been stored, the step in box 216 performs any further operations necessary to clear memory component 170. Then the learning response ends.

When a learning response is not performed, the step in box 220 branches based on how generating means 76 should obtain a generated value for the received value stored in box 200. If a previously generated value is stored in learned store 182 for the received value, it can be used to obtain the generated value by the step in box 222. But if the value in learned store 182 is an initialized value, indicating that no generated value has been stored, the step in box 224 can obtain a random or pseudorandom number as the generated value. The step in box 224 can also be performed in any other situation in which the value from learned store 182 is inappropriate.

The generated value, whether 1From box 222 or box 224, is stored in temporary store 180 by the step in box 226. In addition, the generated value can be used to obtain an output value or a received value.

FIG. 8 shows general steps in a technique that uses generated values in obtaining received values. The steps in FIG. 8 can be performed by components added to those in FIG. 3, and are consistent with the steps in FIG. 2.

The step in box 240 starts the received value at an initial value. This step can be performed by initializing a counter, a register, or similar memory component that holds a running value. The contents of the counter can be provided as a received value whenever appropriate.

The received value is evaluated to determine whether it meets a criterion, such as a threshold, by the step in box 242. This step illustrates one way the steps in boxes 42 and 50 in FIG. 2 can be implemented. If the criterion is a threshold, the step in box 242 can compare the received signal with the threshold. The result of the evaluation can serve as a control data item, with the first value indicating the received value does not meet the criterion and the second value indicating it does.

If the received value does not meet the criterion, the step in box 244 uses the generated value obtained by generating means 76 to update the received value. The update can also depend on a signal received from an external source. This step can be performed by receiving means 72.

When the received value meets the criterion, the step in box 246 provides an output pulse and restarts the received value. After the step in box 246, the received value begins at the same initial value as after box 240, so that the steps in FIG. 8 can continue until interrupted somehow.

The network fragment in FIG. 9 illustrates how modules performing steps like those in FIG. 8 can be interconnected. The modules in FIG. 9 are localized into groups 260 and 262.

Within each group, the modules are extensively interconnected, but only the output from module 264 in group 260 is received by module 266 in group 262 to provide a connection between the groups.

The output from module 264 is also received by module 268 in group 260, whose output is in turn received by module 264. This provides a short feedback path, helpful in maintaining stability within group 260.

C. Limited Length Sequential Memory Capacity

The capacity of a memory can be measured in several ways. FIG. 10 shows how static input and output memory capacity can be measured. FIG. 11 shows a memory with limited length sequential input capacity.

Memory 280 in FIG. 10 has K input lines and L output lines. Memory 280 can be a read-only memory (ROM), capable of providing any of 2L possible output values in response to each of 2K distinguishable input values or addresses. The capacity of memory 280 can be measured in at least two ways. An input capacity can be measured as $\log_2(2K)=K$, while an output capacity can be measured as $\log_2(2L)=L$, on the theory that $\log_2(P)$ measures the binary information content of P.

If memory 280 is a ROM, the output value provided in response to each input value is the same, regardless of the sequence in which the input values are provided. But if memory 280 is a random access memory (RAM) that can be written, so that one of its input lines is a read/write enable line, the sequence of input values matters: If an input data value is written into an address, the stored value can be read by providing the same address. This suggests that the static capacity of a memory is not the same as the sequential capacity.

FIG. 11 illustrates sequential input capacity of a memory. As suggested above, static input capacity can be measured as the logarithm of the number of addresses or input values in response to which a memory can provide independent outputs, i.e., the number of address bits. Similarly, sequential input capacity can be measured as a logarithm of the number of sequences for which a memory can provide independent outputs. To avoid interaction between static and sequential capacity, the logarithmic base for sequential capacity is equal to the number of possible values of each element of a sequence. As a result, the maximum length of distinguishable input sequences is equal to the sequential input capacity.

A conventional ROM has no sequential input capacity because it always responds to a given input with the same output. The maximum length of distinguishable input sequences for a ROM is one, and $\log_n(1)=0$ for all values of n. A read/write RAM, on the other hand, has an indefinite sequential input capacity if the read/write enable line and the data lines are treated as part of the input, because an input sequence of any length can be devised to which the RAM's output is not always the same for two different occurrences of that sequence because of previously stored data.

FIG. 11 shows a simple memory component with a definite sequential input capacity greater than zero. Memory component 290 includes eight bit shift register 292 with bits $b_0$–$b_7$ and RAM 294. RAM 294 has a read/write enable line which is held to enable reading.

To determine the sequential input capacity of memory component 290, it is useful to consider whether the output in response to a sequence of a given length differs for different occurrences of the sequence. For example, for a sequence of three bits, assuming shift register 292 is not cleared before the sequence, bits $b_5$–$b_7$ are determined by the sequence while bits $b_0$–$b_4$ are determined by previously stored data. Therefore, there are 25 or 32 different eight-bit addresses that could occur after the three-bit sequence is received.

For a sequence of seven bits, on the other hand, there are only two different eight-bit addresses that could occur. And for a sequence of eight or more bits, there is only one eight-bit address that could occur, so that the output at the end of each occurrence of such a sequence is the same as long as no write operations are performed.

We can restate the definition of sequential input capacity C of a memory as follows: C is the sequence length such that there is no input sequence of length C after which the memory's output is always the same, while there is no input sequence of length greater than C for which the output is not always the same. This definition is only applicable to a memory with fixed length sequential input capacity. It may be possible to simulate any memory with limited length sequential input capacity as a finite number of memories, each with a fixed length capacity. For a ROM, this definition yields C=0, which is intuitively correct.

Generalizing over the architecture of FIG. 11, S can be taken to be the lesser of the number of address bits of RAM 294 and the number of positions in shift register 292 and T to be the number of bits in each position of shift register 292. The total input capacity can be calculated as $(S-1)T$, with $S-1$ being sequential input capacity and T being static input capacity.

The architecture of FIG. 11 allows construction of a memory with an arbitrarily large fixed sequential input capacity. Shift register 292 can be replaced by a stack or other appropriate memory or data structure, and RAM 294 can be replaced by a look up table or other appropriate memory or data structure.

D. Implementations

The invention could be implemented in numerous ways using a wide variety of hardware and software components.

1. Dual Memory Implementations

Figure 12:
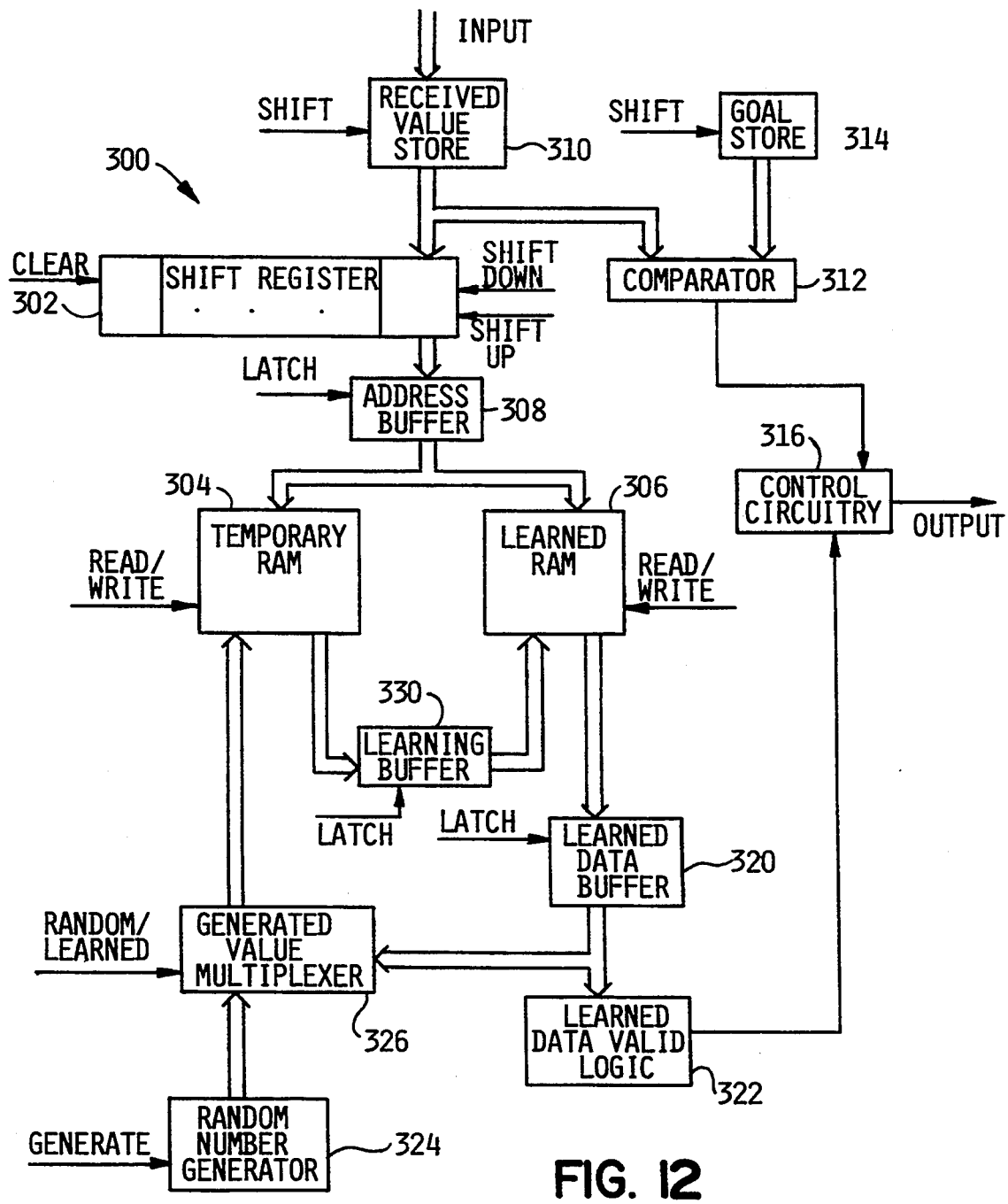
FIG. 12 is a schematic block diagram showing components in an implementation of the self-programming component of FIG. 3.
Figure 13:
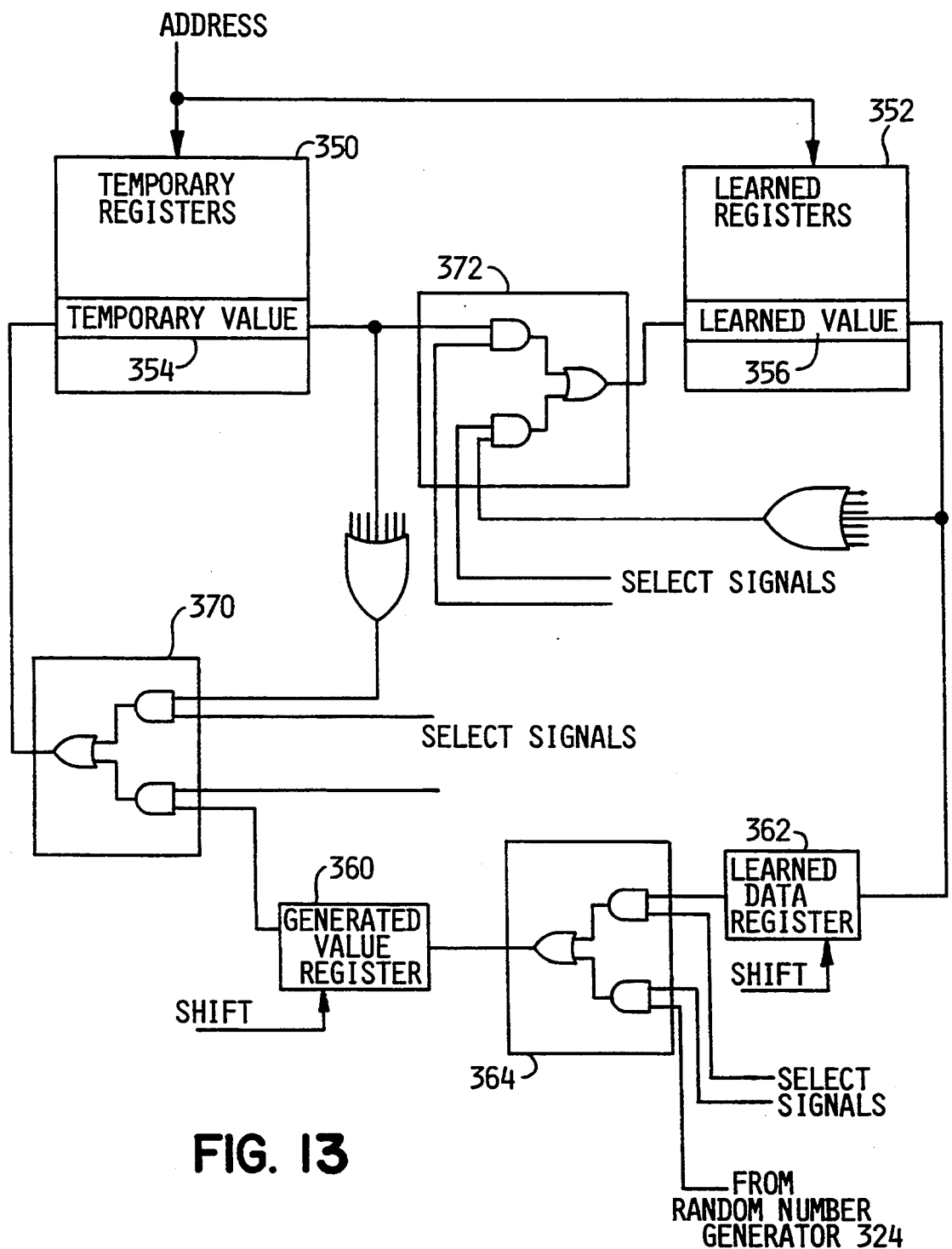
FIG. 13 is a schematic block diagram of an alternative implementation of some components in FIG. 12.
Figure 14:
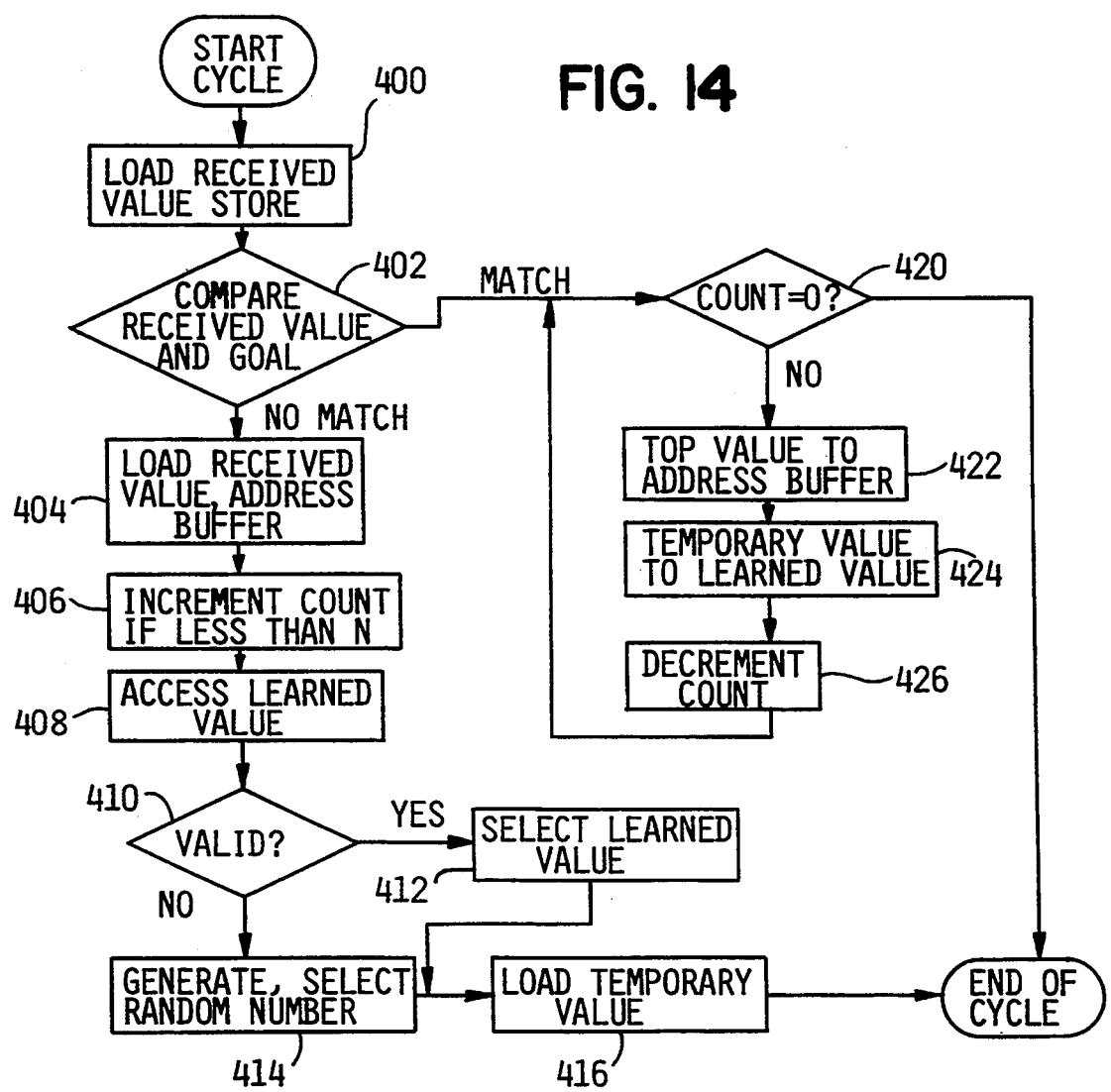
FIG. 14 is a flow chart of steps in operation of the components in FIGS. 12 and 13.
Figure 15:
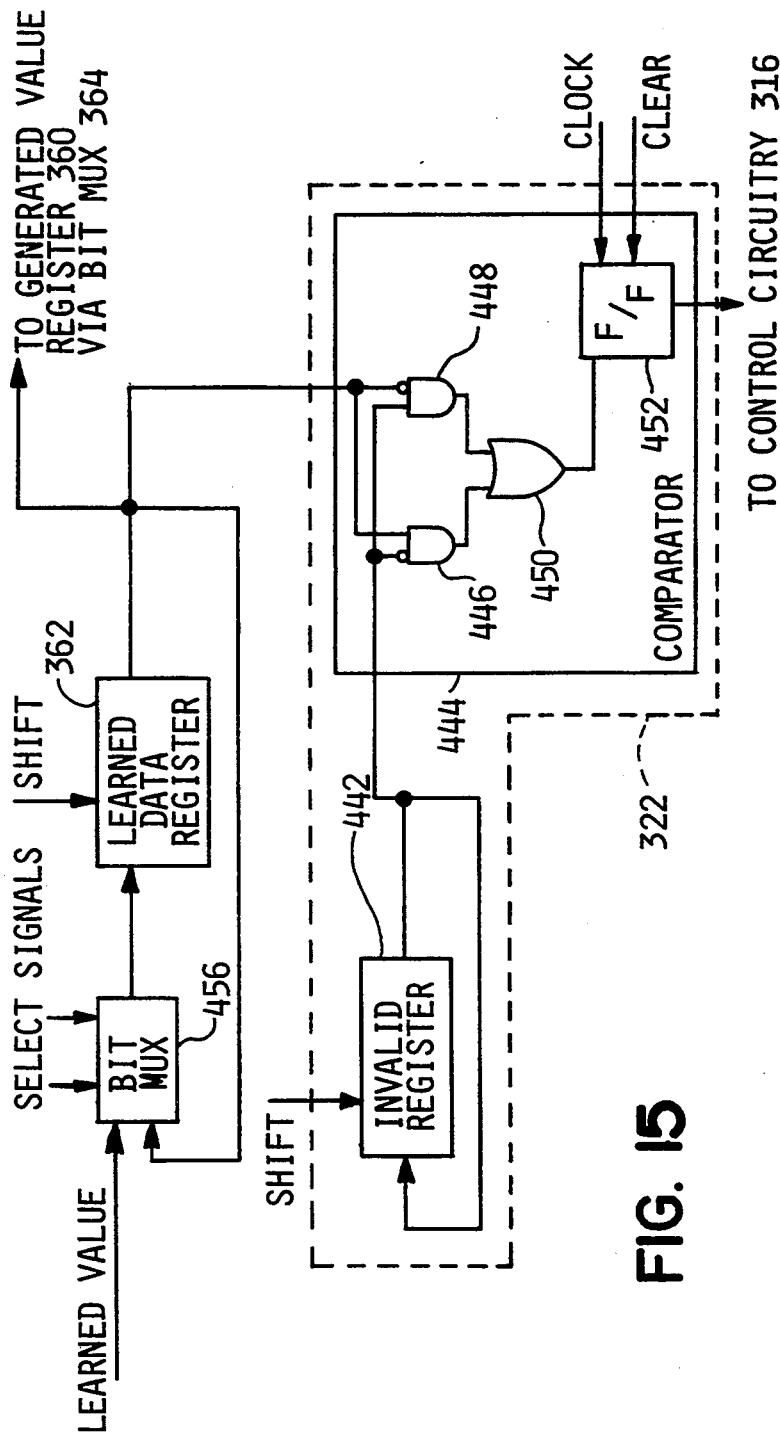
FIG. 15 is a schematic block diagram of components implementing valid output logic in FIG. 12.
Figure 16:
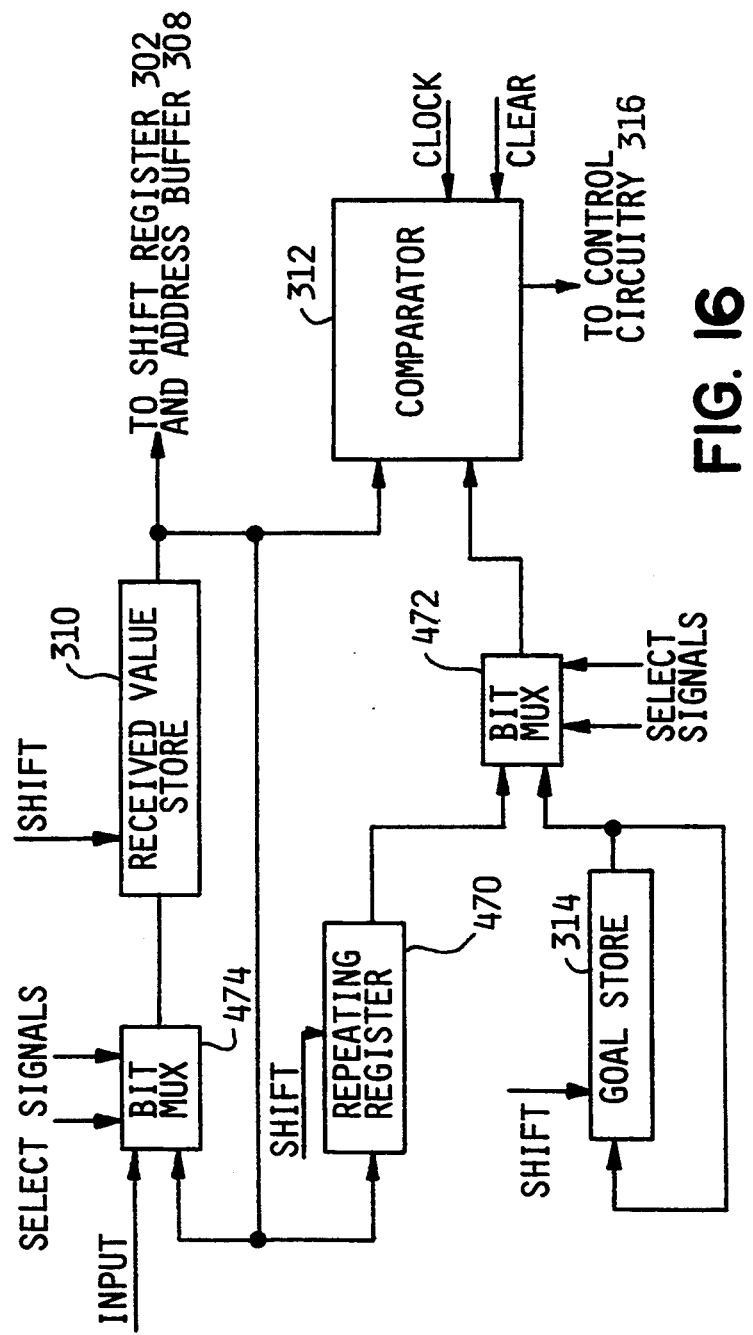
FIG. 16 is a schematic block diagram of components used in detecting repeated received values with the circuitry of FIG. 12.
Figure 17:
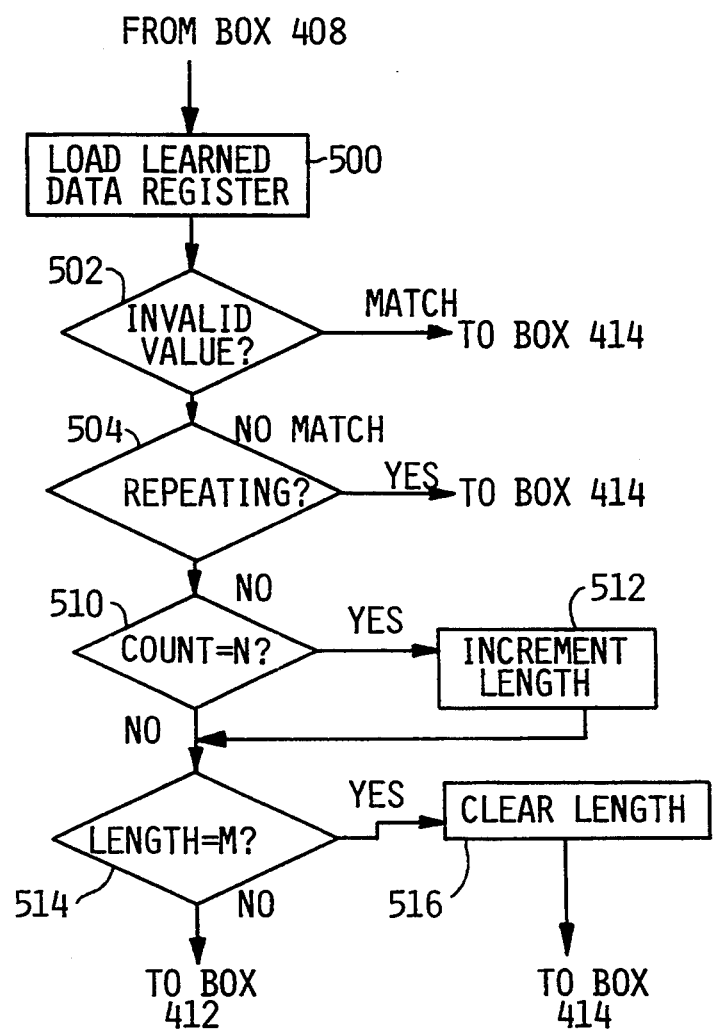
FIG. 17 is a flow chart of steps in operating the components of FIGS. 15 and 16.
Figure 18:
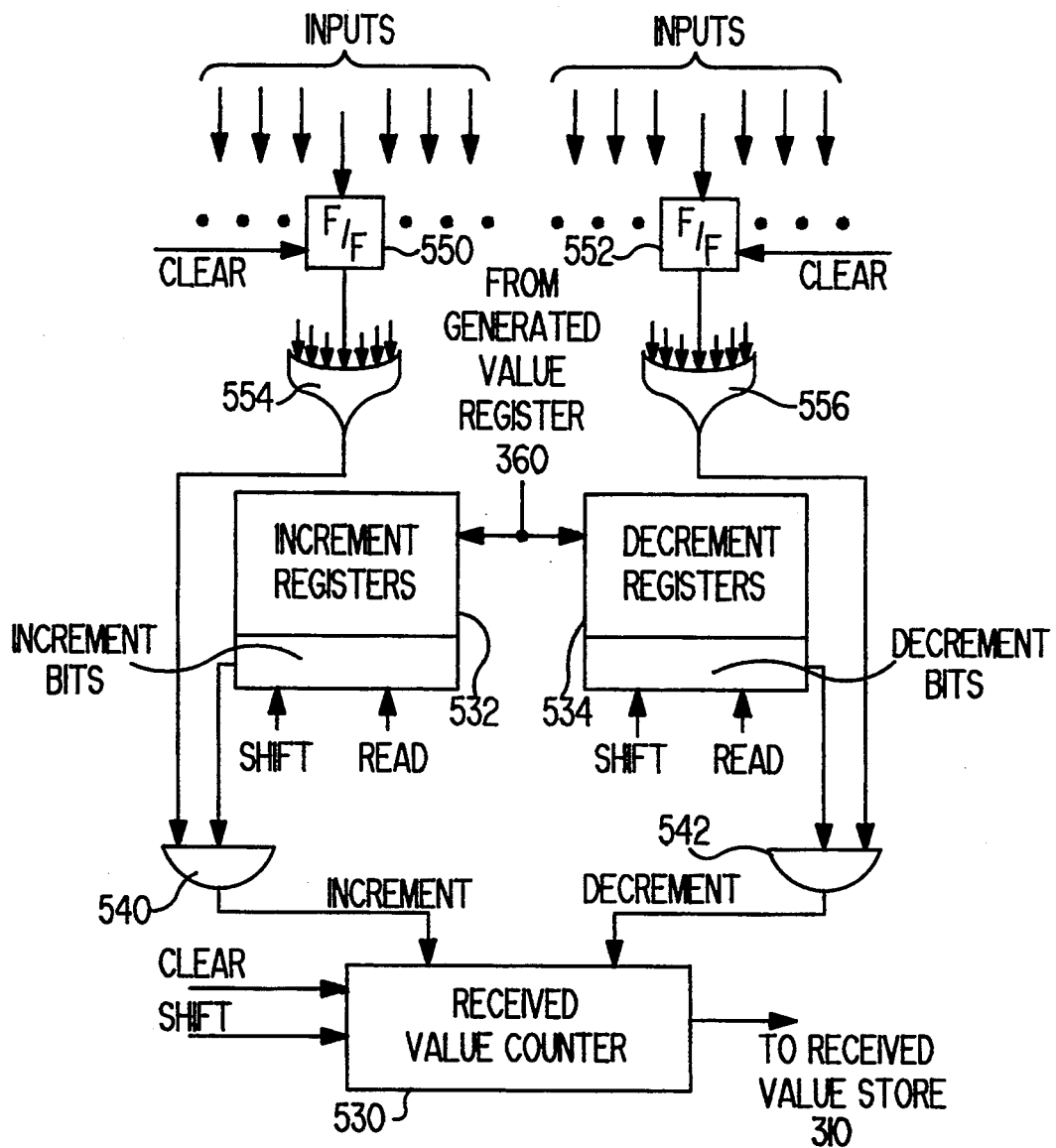
FIG. 18 is a schematic block diagram of components that obtain a received value.
Figure 19:
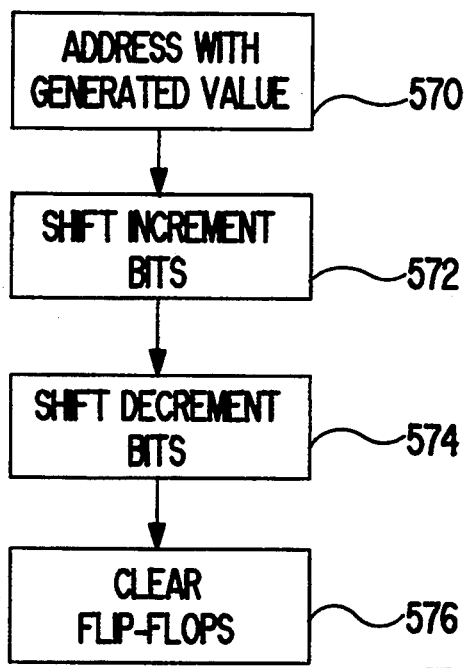
FIG. 19 is a flow chart of steps in operating the components of FIG. 18.

The technique illustrated in FIG. 11 can be extended to dual memories in order to implement the invention. FIG. 12 shows the major components of a module that is an example of such an implementation. FIG. 13 shows an alternative implementation of the dual memories of FIG. 12. FIG. 14 shows steps performed during operation of the components in FIG. 12 in response to signals from control circuitry. FIG. 15 shows an implementation of learned data valid logic 322 in FIG. 12. FIG. 16 shows how a repeating received value can be detected. FIG. 17 shows steps in box 410 in FIG. 14. FIG. 18 shows how a received value can be obtained, and FIG. 19 shows steps in operating the circuitry of FIG. 18.

Module 300 in FIG. 12 includes shift register 302, temporary RAM 304 and learned RAM 306 implementing respectively memory component 170, temporary store 180 and learned store 182 in FIG. 6. Address buffer 308 is connected to receive a value from the upper position of shift register 302 and to provide those bits as an address to temporary RAM 304 and learned RAM 306. Together, these components perform the function of storing means 78 in FIG. 3, and also participate in the function of generating means 76.

Shift register 302 can alternatively be constructed as an array of M single bit shift registers, each of length N. Address buffer 308 and received value store 310 can be connected to the uppermost bit of each shift register such that all the uppermost bits can be loaded in parallel from received value store 310 during a downward shift operation and so that address buffer 308 can be loaded from all the uppermost bits in parallel during an upward shift operation.

Received value store 310, with other components such as those discussed below, performs the function of receiving means 72 in FIG. 3. Received value store 310 can, as described below, be implemented as an up and down counter whose value can be read in parallel or by shifting in serial.

Received value store 310 is also connected so that the value it contains can be shifted serially to comparator 312 for comparison with a similarly shifted value from goal store 314. Comparator 312 can be implemented with conventional digital circuitry to provide a signal whenever the two values match or whenever the value from received value store 310 equals or exceeds the value from goal store 314. Control circuitry 316 receives signals from comparator 312, and controls operations by other components in response, so that comparator 312, control circuitry 316, and goal store 314 perform the function of control data means 74 in FIG. 3.

Learned RAM 306 responds to an address from address buffer 308 and a read signal by providing a stored value at its data port, which is connected so that the output value can be stored in learned data buffer 320. The value from learned data buffer 320 is received by learned data valid logic 322 which provides a signal to control circuitry indicating whether the value is a dummy value stored during initialization of learned RAM 306 or a learned value.

When appropriate, random number generator 324 can generate a value through conventional random or pseudo-random generating techniques. Generated value multiplexer 326 selects a random value from random number generator 324 or a learned value from learned data buffer 320 as a generated value, these components performing the function of generating means 76 in FIG. 3. The generated value is provided to the data port of temporary RAM 304 for storage in response to a write signal, and can also be provided to other components as discussed below.

When a learning response occurs., temporary RAM 304 responds to an address from address buffer 308 and a read signal by providing a stored value at its data port. Learning buffer 330 is connected to latch this value and provide it to the data port of learned RAM 306, which stores it in response to a write signal and the same address.

FIG. 13 shows an alternative implementation of some components in FIG. 12 that omits learning buffer 330. Temporary registers 350 and learned registers 352 are banks of addressable shift registers that replace temporary RAM 304 and learned RAM 306, respectively. These banks can be implemented so that only an addressed register is shifted. Each bank includes one shift register for each possible address value, with shift register 354 in temporary registers 350 storing a temporary value and with shift register 356 in learned registers 352 storing a learned value.

Each of temporary registers 350 can be loaded from generated value register 360, replacing generated value multiplexer 326. Generated value register 360 can in turn be loaded from random number generator 324, implemented to provide a serial number, or from learned data register 362, loaded from one of learned registers 352. Bit multiplexer 364, which can be implemented with two AND gates and an OR gate as shown, responds to select signals indicating the source from which generated value register 360 is loaded.

Bit multiplexers 370 and 372 similarly select the sources from which addressed registers in temporary registers 350 and learned registers 352 are loaded. If an item has been generated, it is loaded into one of temporary registers 350 while the addressed register in learned registers 352 is reloaded with its own previous contents. During a learning response, each addressed register from temporary registers 350 is shifted into one of learned registers 352 and can at the same time is reloaded with its own previous contents. In response to an input value, an addressed register in learned registers 352 can be shifted into learned data register 362, while the addressed registers in both temporary registers 350 and learned registers 352 are reloaded with their previous contents.

FIG. 14 illustrates how control circuitry 316 can control components like those in FIG. 12 or 13 to perform steps implementing the techniques of FIGS. 2 and 7.

The step in box 400 begins by loading a received value into received value store 310. The step in box 402 shifts received value store 310 and goal store 314 so that comparator 312 can compare them. In response to the comparison result, control circuitry branches, either generating a value or performing a learning response.

If the values do not match, the step in box 404 begins the operation of generating a value by loading the received value into shift register 302, shifting previously loaded values downward. The received value is also loaded into address buffer 308 to address temporary RAM 304 and learned RAM 306 or to address temporary registers 350 and learned registers 352.

The step in box 406 increments a running count of values in shift register 302 until the count reaches N. This count is subsequently used to determine how many values to store during a learning response.

The step in box 408 accesses the addressed value in learned RAM 306 or learned register 352, storing it temporarily in learned data buffer 320 or learned data register 362.

The step in box 410 operates learned data valid logic 322 to determine whether the learned value will be the generated value. If so, the step in box 412 operates generated value multiplexer 326 or bit multiplexer 364 to select the learned value as the generated value. If not, the step in box 414 operates random number generator 324 to obtain a random number, which is similarly selected as the generated value. The step in box 416 completes the cycle by loading the generated value from generated value multiplexer 326 or from generated value register 360 by writing to temporary RAM 304 or by shifting into temporary registers 350.

If the step in box 402 finds that the values match, the step in box 420 begins an iterative loop that performs the learning response. The number of iterations is equal to the count incremented in box 406, but never more than N.

The step in box 422 begins an iteration by shifting shift register 302 to load the top received value into address buffer 308. The step in box 424 then transfers the addressed value in temporary RAM 304 or temporary registers 350 into learned RAM 306 or learned registers 352. The step in box 426 completes the iteration by decrementing the count.

When the count reaches zero, shift register 302 can be cleared because its contents are no longer useful. Any other appropriate steps can also be taken to restart in a way that avoids getting stuck. This completes a learning response cycle.

FIG. 15 shows how learned value valid logic 322 in FIG. 12 could be implemented with learned data register 362 and generated value register 360 as in FIG. 13. Learned value register 362 receives a learned value from learned registers 352. An invalid value, which is not actually a learned value but rather results from initialization, can be stored in invalid register 442.

Comparator 444 can compare a value from learned data register 362 with the invalid value from invalid register 442. When one of AND gates 446 and 448 detects a bit at which one input is different than the other, OR gate 450 provides an ON signal that writes flip-flop 452 to store an ON value. Flip-flop 452 thus provides a signal indicating whether the compared values match.

Learned data register 362 is also connected so that its value can be shifted to generated value register 360 through bit multiplexer 364. Its value can also be reloaded, with bit multiplexer 456 receiving signals selecting between reloading and receiving a value from learned value registers 352. Bit multiplexer 450 can be implemented like those in FIG. 13.

FIG. 16 shows additional components used by control circuitry 316 in making the determination in box 410 in FIG. 14. Received value store 310 can be shifted into repeating register 470 to permit comparison of consecutive received values to detect repeating. Signals to bit multiplexer 472 select whether the value in received value store 310 is compared with repeating register 470 or goal store 314 by comparator 312, which can be implemented as in FIG. 15. (Comparator 312 could alternatively be implemented to determine whether a received value is greater than or equal to a value in goal store 314.) To permit both comparisons, received value store 310 can be reloaded by select signals to bit multiplexer 474.

Operation of the circuitry in FIGS. 15 and 16 can be understood from FIG. 17, showing steps followed by control circuitry 316 in the step in box 410 in FIG. 14. These steps determine not only whether a valid learned value is stored, but also whether a repeating sequence of received values has been received; whether a lengthy sequence without a learning response has occurred; and whether it is necessary to restart after a learning response. If any problem with using a learned value is detected, a random number is generated.

The step in box 500 begins by loading a learned value, accomplished by applying a select signal to bit multiplexer 456 and a series of shift signals to learned data register 362. After a clear signal to comparator 444, a select signal to bit multiplexer 456 sets up reloading of learned data register 362. Then, a sequence of shift signals to learned data register 362 and invalid register 442 performs the comparison in box 502. After each shift and an appropriate propagation delay, flip-flop 452 is clocked to store the result.

If the result after the comparison indicates a match, the learned value is not valid. In other words, it is a value stored before any learned value was stored. Therefore, control circuitry 316 signals random number generator 324 to obtain a random number in box 414 in FIG. 14. A random number can be obtained, for example, from a high frequency bistable oscillator or clock whose value is output in response to a generate signal. If this technique is used, the oscillations and the generate signals must occur such that the result is an even distribution of generated values. A select signal to bit multiplexer 364 and a sequence of shift signals to generated value register 360 loads the random number.

If the result after the comparison indicates no match, the learned value is valid. But it may be undesirable to use the learned value bacause a repeating received value has occurred or because a long sequence of steps has passed without a learning response. (A repeating received value might, on the other hand, be desirable to produce a sort of resonance.)

The step in box 504 determines whether the received value is repeating. If a step's received value does not match goal store 314 as determined in box 402 in FIG. 14, it would be provided in box 404 to shift register 302 and address buffer 308 by a select signal to bit multiplexer 474 in FIG. 16 to reload receive value store 310, then a sequence of shift signals. This makes the step in box 504 possible.

When it occurs, the step in box 504 provides a select signal to bit multiplexer 472 and a clear signal to comparator 312, and finally a sequence of shift and clock signals to compare the received value with a previous step's received value from repeating register 470. During this operation, the received value from received value store 310 is also shifted into repeating register 470 for comparison with the next received value.

Control circuitry 316 may count repetitions each time it detects one in box 504 until it reaches a limit or it could branch to box 414 after a single match from comparator 312. The branch to box 414 obtains a random number as the generated value, as described above.

If the limit on repetitions is not reached in box 504, the step in box 510 determines whether the count from box 406 has reached N. If so, the step in box 512 increments a length. Then the step in box 514 determines whether the length has reached M, so that (N+M) cycles have been performed without a learning response. If so, length is cleared in box 516 before branching to box 414 to obtain a random number as the generated value. Length should also be cleared whenever a match is detected in box 402 in FIG. 14.

If (N+M) cycles have not yet been performed, the learned value can be used as the generated value. A select signal to bit multiplexer 364 and a sequence of shift signals transfers the learned value from learned data register 362 to generated value register 360, in box 412 in FIG. 14.

The steps in box 402 in FIG. 14 can implement the step in box 242 in FIG. 8. Whenever a match is found in box 402, an output pulse can be provided in box 246 and the received value can be restarted. FIG. 18 shows components that can be used to maintain and update the received value, and FIG. 19 shows steps in operating the components of FIG. 18.

In FIG. 18, received value counter 530 has the same number of bit positions as received value store 310, and is connected so that the value it stores can be shifted to received value store 310 in box 400 in FIG. 14 to begin a cycle. Received value store 310 could alternatively be loaded in parallel. Received value counter 530 can also be cleared to zero, which can be done by control circuitry 316 at the very beginning of operations, as in box 240 in FIG. 8. Control circuitry 316 can also clear received value counter 530 at the same time it provides an output pulse, as in box 246 in FIG. 8.

During an interval between its clear operation, received value counter 530 can be incremented and decremented. Increment registers 532 are a set of addressable registers, any one of which can be shifted to increment received value counter 530. For example, if each register includes three bits, counter 530 could be incremented zero, one, two, or three times, depending on the values of the bits. Similarly, decrement registers 534 can each be shifted to decrement counter 530.

Bits shifted from increment registers 532 are controlled by AND gate 540, while AND gate 542 controls bits shifted from decrement registers 534. AND gates 540 and 542 are controlled by pulses received from other modules. For each other module, a respective flip-flop, such as flip-flops 550 and 552, receives and latches a pulse. Some of the latched values are provided through OR gate 554 to control AND gate 540, while others are provided through OR gate 556 to control AND gate 542. As a result, the incrementing and decrementing of counter 530 depends on whether pulses have been received. Input pulses could alternatively be counted directly, but the arrangement of FIG. 18 also allows a generated value from generated value register 360 to affect the rates at which counter 530 is incremented and decremented.

FIG. 19 shows steps in performing the step in box 244 in FIG. 8. As will be understood from FIG. 18, the latching of input values does not require control, but when a generated value has been obtained in one of boxes 412 and 414 in FIG. 14, the step in box 416 can also perform the steps in FIG. 19 to update the received value prior to the end of a cycle.

The step in box 570 uses the generated value to address increment registers 532 and decrement registers 534. Since the generated value is received as a series of bits, this step can be performed by applying a read signal that gates the generated value into address decoding circuitry for each set of registers. The decoding circuitry can be implemented with conventional state machine techniques, and the registers themselves could be replaced with state machine logic.

When the registers have been addressed a sequence of shift signals to increment register 532 shifts increment bits through AND gate 540, if enabled, to counter 530, in box 572. Then, in box 574, a sequence of shift signals to decrement registers 534 shifts decrement bits through AND gate 542, if enabled, to counter 530. Finally, the flip-flops, including flip-flops 550 and 552, are cleared in box 576.

As will be understood from the above description, a circuit that includes a number of interconnected modules could be "tuned" in a variety of ways. For example, the ratio of inputs to OR gates 554 and 556 will affect the rate at which counter 530 is incremented and decremented. Also, if the frequency of pulses is such that at least one input pulse reaches both OR gate 554 and OR gate 556 during each cycle, the inputs will have no effect on counter 530; this could be solved by periodically clearing the flip-flops or by introducing additional logic to apply a threshold or a decay function to the input operation. Also, a decay function could be applied to counter 530, either as a constant or under the control of generated values. All of these measures would have the objective of tuning the frequency at which received value counter 530 reaches the value in goal store 314 in FIG. 12.

2. Interconnecting Modules

One way of interconnecting modules was described above in relation to FIG. 9. Modules could be interconnected in numerous other ways, depending on the task. For example, modules could be connected so that a generated value from one module is provided as output and is received by one or more other modules as input.

Figure 20:
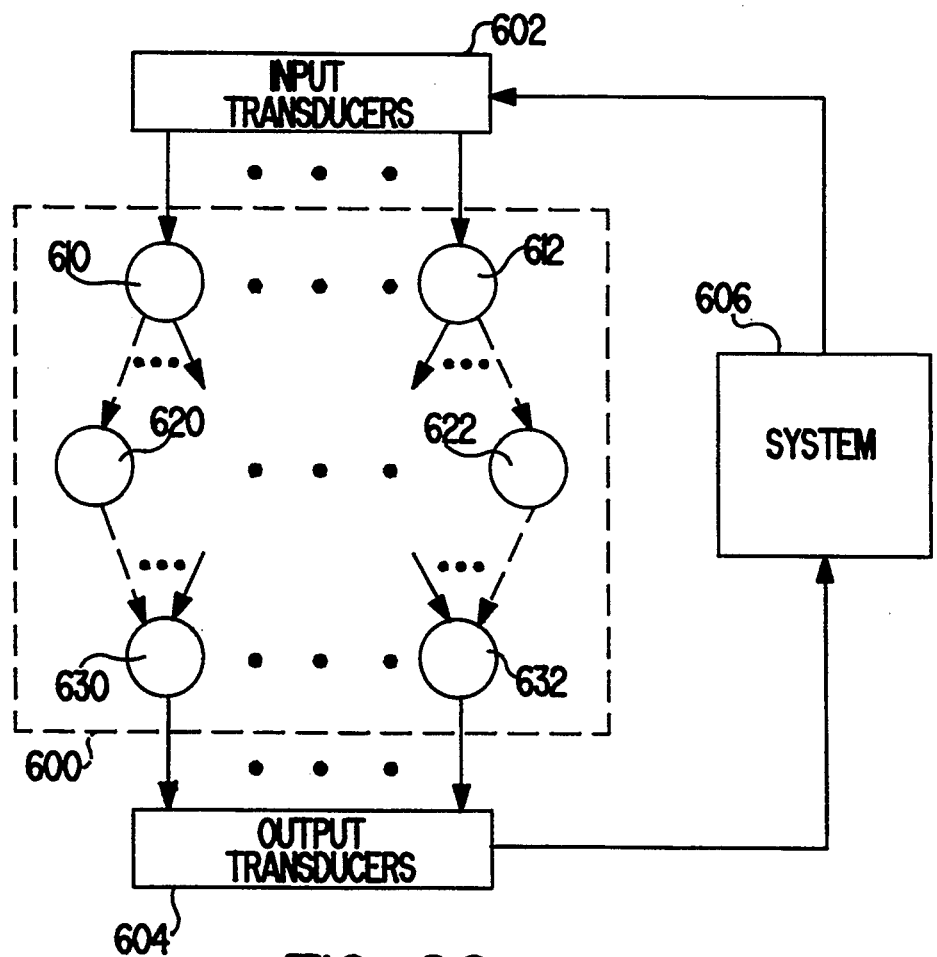
FIG. 20 is a schematic diagram of a network with modules interconnected as in FIG. 9.
Figure 21:
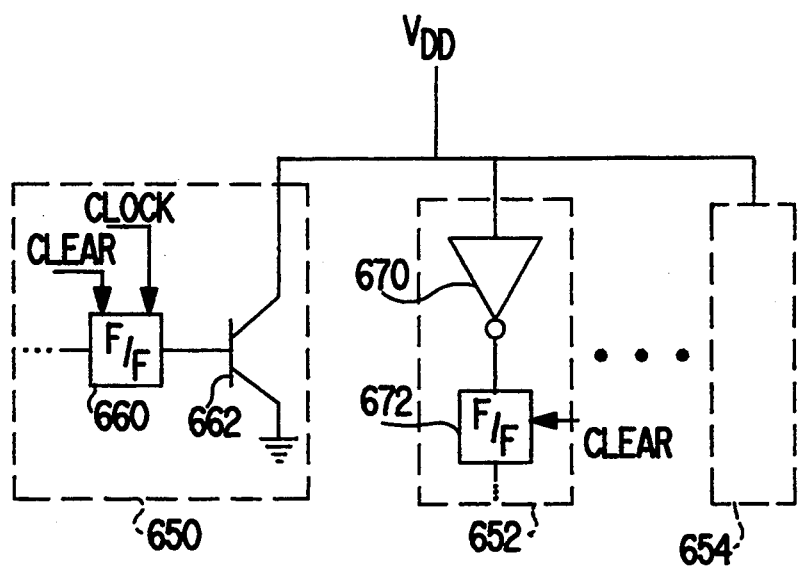
FIG. 21 is a schematic diagram showing how a number of modules receive a signal from another module.
Figure 22:
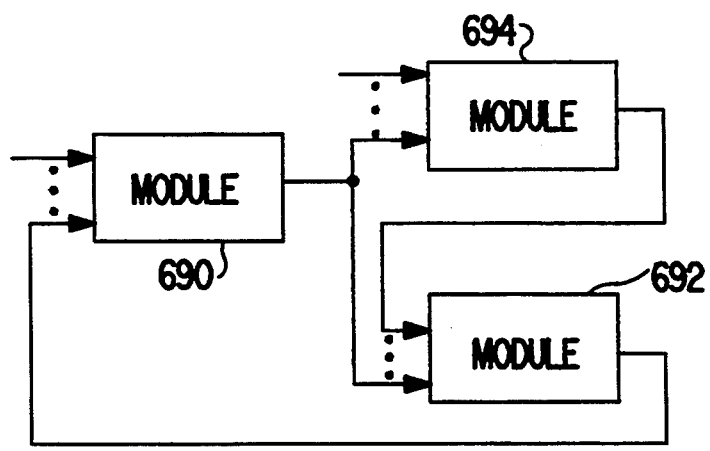
FIG. 22 is a schematic circuit diagram showing feedback loops within a network of interconnected modules.

FIG. 20 shows general features of a network in which modules are interconnected as in FIG. 9. FIG. 21 shows an example of circuitry by which a number of modules receive a signal from another module. FIG. 22 shows feedback loops within a network of interconnected modules.

In FIG. 20, network 600 receives input signals from input transducers 602 and provides output signals to output transducers 604. These input and output signals can have the same characteristics as signals between modules within network 600, so that no special circuitry is required within network 600 to receive input signals and to provide output signals.

Input transducers 602 can include any appropriate combination of sensors, and output transducers 604 can include any appropriate activators. Output transducers 604 operate on system 606, and input trandsucers 602 sense states of system 606. As described in U.S. patent application Ser. No. 06/776,819, incorporated herein by reference, a self-programmer can interact with a system based on a relationship between its outputs to the system and inputs from the system. In FIG. 20, network 600 acts as a self-programmer in relation to system 606.

Each module within network 600 can be implemented so that it provides an output pulse in the manner described above in relation to FIG. 8. Each module can be connected into a local group, within which modules are heavily interconnected. In contrast, there may be few interconnections between groups, as described above in relation to FIG. 9.

In network 600, input local groups 610 through 612 receive signals from input transducers 602. Although a local group could connect directly to both input transducers 602 and output transducers 604, intermediate local groups 620 through 622 are illustratively connected between input local groups 610 through 612 and output local groups 630 through 632. Output local groups 630 through 632 provide signals to output transducers 604.

As indicated in FIG. 20, the only external signal connections between modules are the inputs and outputs. Each module can receive as inputs the outputs from a number of other modules, including modules to which it provides its own output. The modules can be arbitrarily interconnected. The network can be thought of as amorphous. It is not necessary that all modules receive the same number of inputs or that a module have all of its input lines receiving signals. The network can be expanded simply by adding a module connected to receive outputs from modules in the network and to provide its output to modules in the network.

In FIG. 21, module 650 provides its output to modules 652 through 654. Some of the circuitry in modules 650 and 652 is shown.

Module 650 includes flip-flop 660 which can be operated like flip-flop 452 in FIG. 15, as part of comparator 312 in FIG. 16 when received value store 310 is compared with goal store 314. If the result of the comparison is that the received value is equal to or greater than the goal value, a high value can be stored in flip-flop 660 by a signal on its clock line from control circuitry 316. As a result, transistor 662 becomes conductive, pulling down the voltage on a line connected to modules 652 through 654.

While the line is pulled down, inverter 670 provides a high signal to flip-flop 672. Since modules 650 and 652 through 654 are not synchronized, flip-flop 672 is connected so that it latches the high value when received, as described in relation to FIG. 18, above.

After a given time, control circuitry 316 in module 650 provides a clear signal to flip-flop 660. Transistor 662 becomes non-conductive, and the interconnecting line returns to voltage $V_{DD}$, ending the output pulse from module 650.

FIG. 22 shows how densely interconnected modules can provide multiple feedback paths, allowing a variety of resonance effects. As shown, module 690 provides output signals to modules 692 and 694. Module 694 also provides signals to module 692, which in turn provides an output signal to module 690. Thus, one feedback loop includes only modules 690 and 692, while another includes all three modules.

If each module has more than one stable frequency at which it provides output pulses, a module may make a transition from one frequency to another in response to certain signals. As long as its feedback loops and other inputs allow, it will remain in the second frequency, then making another transition. In effect, each module would learn how to make transitions between its stable frequencies.

3. Simulating Implementation

Although the invention can be implemented in self-programming modules as described above, many features of the invention can alternatively be obtained by implementing the invention through the execution of software.

Figure 23:
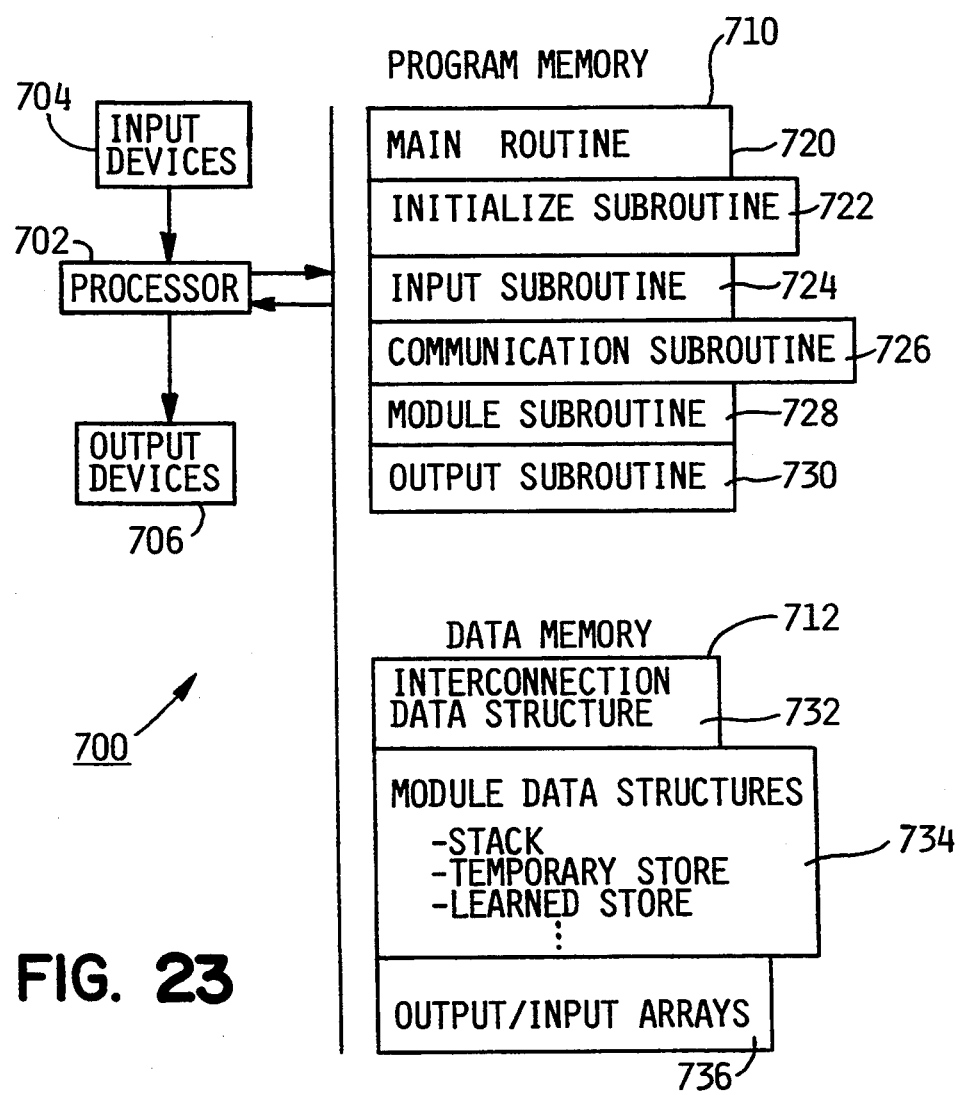
FIG. 23 is a schematic block diagram showing components of a serial machine implementing the invention through execution of software.
Figure 24:
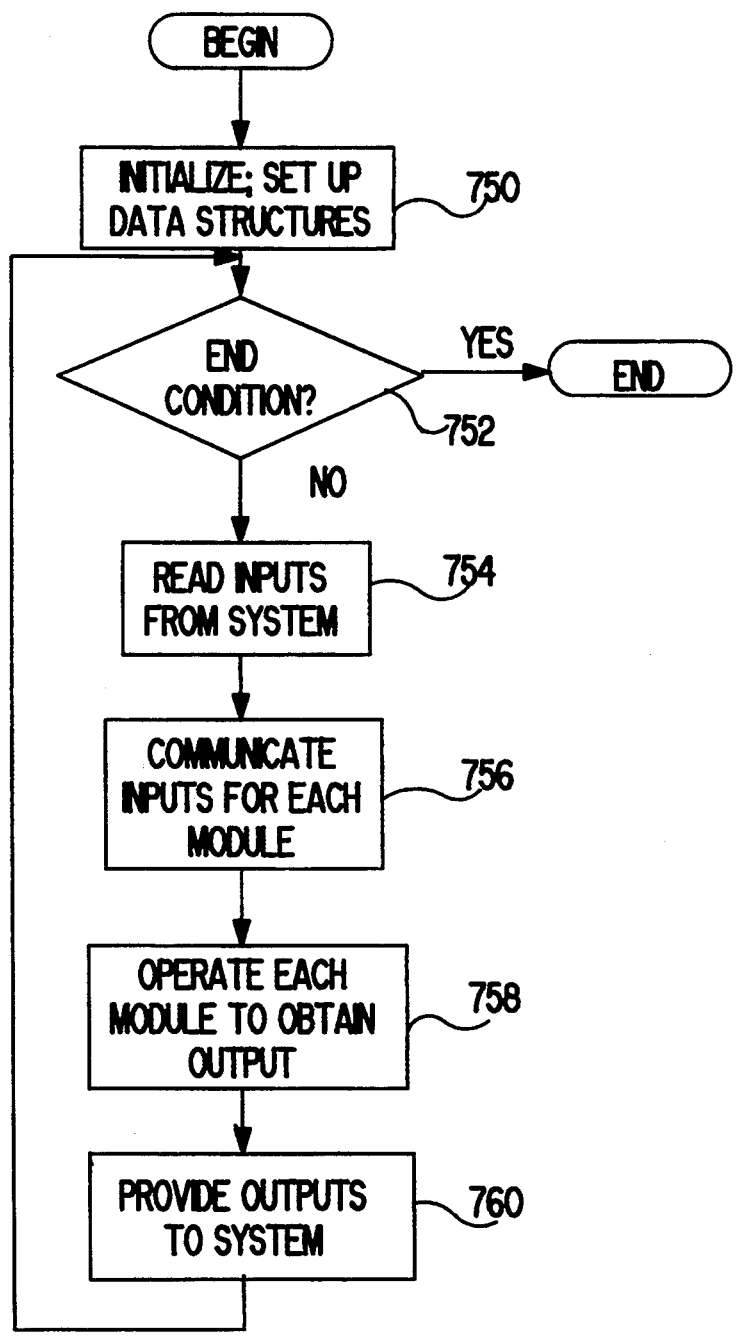
FIG. 24 is a flow chart showing steps in operating the machine of FIG. 23.

FIG. 23 shows a serial machine that can implement the invention. FIG. 24 shows steps in operating the serial machine to do so.

Serial machine 700 in FIG. 23 includes processor 702, receiving inputs from input devices 704 and providing outputs to output devices 706. Processor 702 is also connected to access program memory 710 and data memory 712. While executing instructions from program memory 710, processor 702 can store or retrieve data in data memory 712.

Main routine 720 can call initialize subroutine 722, input subroutine 724, communications subroutine 726, module subroutine 728, and output subroutine 730. These subroutines can access interconnection data structure 732, module data structures 734, and output/input arrays 736. Interconnection data structure 732 indicates which other modules receive the output of each module, and also which modules receive input from and provide output to the system. The system could be an actual system providing inputs through input devices 704 and receiving outputs through output devices 706. Or the system could be simulated by additional routines not shown in FIG. 23.

Each module's data structure can include a stack, temporary registers, learned registers, and other registers as shown. Alternatively, the stack can be implemented to store each received value with the respective generated value, so that a separate temporary store is not required. Each module's data structure could also include data indicating connected modules, but it is more convenient to include such data in interconnection data structure 732.

FIG. 24 shows steps performed by main routine 720 and some of the subroutines during a session of operation. The step in box 750 calls initialize subroutine 722 to set up interconnection data structure 732 and module data structure 734, as well as to perform any other initialization that is required. The connections indicated by interconnection data structure 732 could be received through input devices 704 or could be generated randomly or algorithmically. These interconnections could provide groups of modules as described above in relation to FIG. 20 and feedback loops as described in relation to FIG. 22. Then, the step in box 752 begins an iterative loop that continues until an end condition is met. This end condition could be a maximum number of iterations or any other appropriate condition.

Each iteration begins, in box 754, by calling input routine 724 to read the current inputs from the system, either actual inputs through input devices 704 or simulated inputs. These inputs can be loaded into output/input arrays 736, a data structure that is also used to temporarily store module outputs as described below.

The step in box 756 calls communication subroutine 726 to provide each module's inputs in output/input arrays 736 in accordance with interconnection data structure 732. This step sets up the inputs so that each module can access its inputs as a set.

The step in box 758 calls module subroutine 728 for each module. Module subroutine 728 accesses the module's inputs in output/input arrays 736 and can include the techniques described above for operating on the inputs to produce an output value. For example, it could include calls to further subroutines for each component shown in FIG. 3. Generated values could be stored and obtained in any of the ways described in relation to FIGS. 4A–4C. A learning response could be performed as in FIG. 5 or FIG. 7, in either case clearing the stack when done to ensure no carryover noise. And so forth. Module subroutine 728 thus produces an output value for each module, and stores each module's output value in the appropriate location in output/input arrays 736.

The step in box 760 calls output subroutine 730 to provide outputs, either through output devices 706 or for use in simulating a system. Output subroutine 730 accesses output/input arrays 736 to obtain those output values that are connected to output transducers according to interconnection data structure 732. These values are used to provide output to the system.

D. Applications

Self-programming techniques in accordance with the invention could be used in a wide variety of applications. Of particular interest is the use of interconnected modules in neural network applications such as pattern recognition. It is possible that feedback loops could be used to develop neural networks capable of learning through resonances.

Self-programming techniques might also be applied in hierarchical networks and in other applications, as described in co-owned U.S. patent application Ser. No. 06/776,819, continued as Ser. No. 07/850,214, now issued as U.S. Pat. No. 5,161,232, incorporated herein by reference.

E. Miscellaneous

The invention could be implemented in many other ways in addition to the implementations described above. For example, it might be possible to implement a simulation on a massively parallel SIMD machine, with each processing unit performing the operations of a respective module. The simulation described above synchronizes the simulated modules, but it might also be possible to simulate asynchronous modules.

The training store might be implemented in various additional ways, including a stack, with each entry including a received value and a generated value. Bus connections might be used instead of multiplexing as described above. The goal register might be implemented with tri-state devices, so that it would indicate a set of acceptable input values, defined by whether each bit position is high, low, or don't care. Random or pseudo-random numbers might be generated in a wide variety of ways, including use of bits from the stack of received values or another source, either directly or through appropriate logic.

Although the invention has been described in relation to various implementations, together with modifications, variations, and extensions thereof, other implementations, modifications, and extensions are within the scope of the invention. The invention is therefore not limited by the description contained herein or by the drawings, but only by the claims.

I claim:

1. A method of operating a machine, the method comprising a sequence of steps performed by the machine, each step in the sequence comprising substeps of:
    using an input signal received by the machine to obtain a received signal, the received signal being a data item having a value that is one of two or more possible received values;
    obtaining a control data item using said received signal; the control data item having one of a set of control values including a first control value and a second control value;
    if said control data item has the first control value, using said received signal to generate a generated data item having one of two or more possible generated values; and
    if said control data item has the second control value, storing the generated data item of a preceding step in the sequence so that the preceding step's generated data item can be accessed using a data item having the value of the preceding step's received signal.

2. The method of claim 1 in which the storing substep comprises a substep of storing the preceding step's generated data item and a received signal data item in memory, the received signal data item having the value of the preceding step's received signal; the received signal data item and the generated data item having positions in memory so that the generated data item can be accessed based on the position of the received signal data item.

3. The method of claim 2 in which the preceding step's generated data item's position is immediately after the received signal data item's position.

4. The method of claim 2 in which the preceding step's generated data item is positioned in a lookup table that provides the preceding step's generated data item when accessed using a data item having the value of the received signal data item.

5. The method of claim 1 in which the storing substep comprises a substep of storing the preceding step's generated data item at a position in memory that can be accessed using a data item having the value of the preceding step's received signal.

6. The method of claim 5 in which positions in the memory can be accessed with addresses, the address of the preceding step's generated data item's position being the value of the preceding step's received signal.

7. The method of claim 1 in which the substep of obtaining a control data item comprises a substep of obtaining criterion data indicating whether the received signal meets a criterion; the criterion data being the control data item.

8. A machine comprising:
    receiving circuitry for using input signals to obtain received signals in sequence, each received signal being a data item having a value from two or more possible received values;
    control data circuitry for using each received signal to obtain a control data item; the control data item having one of a set of control values including a first control value and a second control value;
    generating circuitry for using each received signal whose control data item has the first control value to generate a generated data item having a value that is one of two or more possible generated values;
    first storing circuitry for storing a limited length sequence of the received signals whose control data items have the first control value;
    second storing circuitry for storing the generated data item of each received signal in the limited length sequence stored in the first storing circuitry; and
    third storing circuitry for responding to each received signal whose control data item has the second control value by storing, for each of a set of received signals in the stored limited length sequence, the generated data item of the received signal from the second storing circuitry so that each received signal in the set can be used to access one of the generated data items.

9. The machine of claim 8 in which the third storing circuitry comprises memory; the third storing circuitry storing each received signal and its generated data item in positions in the memory so that the generated data item's position can be accessed based on the received signal's position.

10. The machine of claim 8 in which the first storing circuitry comprises a shift register.

11. The machine of claim 8 in which the second storing circuitry comprises a first memory and the third storing circuitry comprises a second memory; the first storing circuitry being connected so that the received signals in the limited length sequence can be used to address the first and second memories.

12. The machine of claim 11 in which the third storing circuitry further comprises circuitry for transferring a stored generated data item from the first memory to the second memory when the first and second memories are addressed with one of the received signals in the limited length sequence.

13. The machine of claim 11 in which the generating circuitry comprises circuitry for obtaining a stored generated item from the second memory as a received signal's generated data item when the first and second memories are addressed with the received signal, the received signal being the most recent received signal in the limited length sequence.

14. The machine of claim 11 in which the first and second memories are random access memories.

15. The machine of claim 11 in which the first and second memories each comprise two or more registers.

16. The machine of claim 11 in which the second storing circuitry operates to overwrite a previously stored generated data item in the first memory in response to a received signal whose control data item has the first control value and which has the same value as a previous received signal used to produce the previously stored generated data item.

17. A method of operating a machine, the method comprising a sequence of steps performed by the machine, each step in the sequence comprising substeps of:
using an input signal received by the machine to obtain a received signal, each received signal being a data item having a value that is one of two or more possible received values;
storing said received signal;
obtaining a control data item using said received signal; the control data item having one of a set of control values including a first control value and a second control value;
if said control data item has the first control value, generating and storing a generated data item having one of two or more possible generated values; said received signal and generated data item being stored so that they can both be accessed in a subsequent step; and
if said control data item has the second control value, accessing the received signal and generated data item of each of a set of preceding steps and storing the generated data of each of the set of preceding steps so that it can be accessed using a data item having the same value as the received signal; each of the set of preceding steps being in a sequence of preceding steps having a limited length.

18. The method of claim 17 in which the substep of using the received signal of each of a set of preceding steps comprises a sequence of storing substeps, each storing substep using the received signal of one of the sequence of preceding steps to access and store the respective generated data item.

19. The method of claim 18 in which the sequence of storing substeps begins with a storing substep that uses the received signal of the least recent of the sequence of preceding steps.

20. The method of claim 18 in which the sequence of storing substeps begins with a storing substep that uses the received signal of the most recent of the sequence of preceding steps.

21. The method of claim 17 in which the steps include a first set of two or more steps with received signals having the same value, the steps further including a second set of two or more steps whose control data items have the second control value, the second set of steps including an overwriting step in which the substep of using the received signal of each of a set of preceding signals comprises selecting the generated data item of one of the first set of steps to be overwritten by the generated data item of another of the first set of steps.

22. A machine comprising:
receiving circuitry for using input signals to obtain received signals in sequence, each received signal being a data item having a value from two or more possible received values;
control data circuitry for using each received signal to obtain a control data item; the control data item having one of a set of control values including a first control value and a second control value;
generating circuitry for using each received signal whose control data item has the first control value to generate a generated data item having a value that is one of two or more possible generated values;
storing circuitry for responding to each received signal whose control data item has the second control value by storing, for each of a set of preceding received signals, the received signal's generated data item so that it can be accessed using a data item having the same value as the received signal;
the generating circuitry comprising:
first circuitry for using a received signal to access a generated data item stored by the storing circuitry;
second circuitry for obtaining a random number; and
third circuitry for obtaining a generator data item indicating whether a received signal's generated data item should be obtained from the first circuitry or the second circuitry.

23. The machine of claim 22 in which the third circuitry comprises valid logic for responding to a data item accessed by the first circuitry by obtaining a valid data item indicating whether an accessed data item is a generated data item stored by the storing circuitry; the generator data item indicating that the generated data item should be obtained from the second circuitry if the valid data item indicates that an accessed data item is not a generated data item stored by the storing circuitry.

24. The machine of claim 23 in which the valid logic comprises an invalid register for storing an invalid data item and a comparator connected for receiving the invalid data item from the invalid register and a data item accessed by the first circuitry; the valid data item indicating that an accessed data item is a generated data item stored by the storing circuitry if the invalid data item and the accessed data item have the same value.

25. The machine of claim 22 in which the third circuitry comprises a repeat register for storing a received signal and a comparator connected for receiving the stored received signal from the repeat register and a following received signal, the comparator providing a repeat data item indicating whether the following received signal has the same value as the stored received signal, the generator data item indicating that the generated data item should be obtained from the second circuitry if a number of consecutive repeat data items indicate following received signals with the same value as stored received signals.

26. A method of operating a machine, the method comprising a sequence of steps performed by the machine, each step in the sequence comprising substeps of:

using an input signal received by the machine to obtain a received signal, the received signal being a data item having a value that is one of two or more possible received values;

obtaining a control data item using said received signal; the control data item having one of a set of control values including a first control value and a second control value;

if said control data item has the first control value, using said received signal to generate a generated data item having one of two or more possible generated values; and if said control data item has the second control value, storing, for each of a set of preceding received signals, the received signal's generated data item so that it can be accessed using a data item having the same value as the received signal;

the substep of generating a generated data item comprising substeps of:

obtaining a generator data item having one of a set of generator values including a first generator value and a second generator value;

if the generator data item has the first generator value, providing as the generated data item a stored generated data item accessed using the received signal; and if the generator data item has the second generator value, providing a random number as the generated data item.

27. The method of claim 26 in which the substep of obtaining a generator data item comprises a substep of obtaining a valid data item indicating whether a data item accessed using the received signal is a generated data item stored in a storing substep; the generator data item having the second generator value if the valid data item indicates the accessed data item was not stored in a storing substep.

28. The method of claim 26 in which the substep of obtaining a generator data item comprises a substep of obtaining a repeat data item indicating whether the received signal has a value that has repeated a number of times; the generator data item having the second generator value if the repeat data item indicates the received signal's value has repeated the number of times.

29. The method of claim 26 in which the substep of obtaining a generator data item comprises a substep of obtaining a length data item indicating whether a number of steps have occurred without obtaining a control data item having the second control value; the generator data item having the second generator value if the length data item indicates the number of steps have occurred without a control data item having the second control value.

30. A machine comprising:

receiving circuitry for using input signals to obtain received signals in sequence, each received signal being a data item having a value from two or more possible received values;

control data circuitry for using each received signal to obtain a control data item; the control data item having one of a set of control values including a first control value and a second control value;

generating circuitry for using each received signal whose control data item has the first control value to generate a generated data item having a value that is one of two or more possible generated values;

storing circuitry for responding to each received signal whose control data item has the second control value by storing, for each of a set of preceding received signals, the received signal's generated data item so that it can be accessed using a data item having the same value as the received signal; and output circuitry for responding to each received signal whose control data item has the second control value by providing an output signal.

31. The machine of claim 30 in which the receiving circuitry comprises combining circuitry connected for receiving the input signals and the generated data items; the combining circuitry using the input signals and the generated data items to obtain the received signals.

32. The machine of claim 31 in which the combining circuitry comprises a received value counter; the input signals including a first set of input signals and a second set of input signals; the combining circuitry further comprising increment logic for receiving the first set of input signals and a generated data item and providing an increment signal; the combining circuitry further comprising decrement logic for receiving the first set of input signals and a generated data item and providing a decrement signal; the increment signal incrementing the received value counter and the decrement signal decrementing the received value counter.

33. The machine of claim 32 in which the increment logic comprises increment registers, each storing a set of increment bits, the generated data item accessing one of the increment registers; the increment logic further comprising increment gates for providing the accessed register's set of increment bits as the increment signal if any of the first set of input signals occurs; the decrement logic comprising decrement registers, each storing a set of decrement bits, the generated data item accessing one of the decrement registers; the decrement logic further comprising decrement gates for providing the accessed register's set of decrement bits as the decrement signal if any of the second set of input signals occurs.

34. A method of operating a machine, the method comprising a sequence of steps performed by the machine, each step in the sequence comprising substeps of:

using an input signal received by the machine to obtain a received signal, the received signal being a data item having a value that is one of two or more possible received values;

obtaining a control data item using said received signal; the control data item having one of a set of control values including a first control value and a second control value;

if said control data item has the first control value, using said received signal to generate a generated data item having one of two or more possible generated values;

if said control data item has the second control value, storing the generated data item of a preceding step in the sequence so that the preceding step's generated data item can be accessed using a data item having the same value as the preceding step's received signal; and if said control data item has the second control value, providing an output signal from the machine.

35. The method of claim 34 in which the substep of using an input signal comprises a substep of using a preceding step's generated data item to obtain the received signal.

36. A network comprising two or more circuits; each circuit comprising:

receiving circuitry for using input signals to obtain received signals in sequence, each received signal being a data item having a value from two or more possible received values;

control data circuitry for using each received signal to obtain a control data item; the control data item having one of a set of control values including a first control value and a second control value;

generating circuitry for using each received signal whose control data item has the first control value to generate a generated data item having a value that is one of two or more possible generated values;

storing circuitry for responding to each received signal whose control data item has the second control value by storing, for each of a set of preceding received signals, the received signal's generated data item so that it can be accessed using a data item having the same value as the received signal; and output circuitry for responding to each received signal whose control data item has the second control value by providing an output signal;

the network further comprising connecting circuitry for interconnecting the circuits; the connecting circuitry connecting first and second ones of the circuits so that the output signal from the first circuit is an input signal to the second circuit.

37. The network of claim 36 in which the module connecting circuitry further connects the first and second modules so that the output signal from the second module is an input signal to the first module.

38. The network of claim 36, further comprising an input transducer and an output transducer; the modules including an input set of modules, each of which receives an input signal from the input transducer; the modules further including an output set of modules, each of which provides its output signal to the output transducer.

39. A method of operating a machine that includes memory and a processor connected to access memory; the method comprising cycles of steps, each cycle including steps of:

operating the processor to obtain two or more sets of input data items; and operating the processor to perform, for each of the sets of input data items, a step comprising substeps of:

using an input signal to obtain a received signal, the received signal being a data item having a value that is one of two or more possible received values;

obtaining a control data item using said received signal; the control data item having one of a set of control values including a first control value and a second control value;

if said control data item has the first control value, using said received signal to generate a generated data item having one of two or more possible generated values;

if said control data item has the second control value, storing the generated data item of a preceding cycle so that the preceding cycle's generated data item can be accessed using a data item having the same value as the preceding cycle's received signal; and if said control data item has the second control value, providing an output signal;

the step of operating the processor to obtain two or more sets of input data items comprising, for each cycle after the first cycle, a substep of providing an output signal from a first one of the sets of input data items as an input signal to a second one of the sets of input data items.

* * * * *